US012666474B2

(12) United States Patent
Hwang et al.

(10) Patent No.: US 12,666,474 B2
(45) Date of Patent: Jun. 23, 2026

(54) METHOD AND DEVICE FOR TRANSMITTING VEHICLE-TO-VEHICLE COMMUNICATION MESSAGE IN WIRELESS COMMUNICATION SYSTEM

(71) Applicant: LG ELECTRONICS INC., Seoul (KR)

(72) Inventors: Bong Jun Hwang, Seoul (KR); Young Dae Kim, Seoul (KR); Jong Ok Oh, Seoul (KR); Hyunmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/920,702

(22) PCT Filed: Apr. 23, 2021

(86) PCT No.: PCT/KR2021/005190
§ 371 (c)(1),
(2) Date: Oct. 21, 2022

(87) PCT Pub. No.: WO2021/221396
PCT Pub. Date: Nov. 4, 2021

(65) Prior Publication Data
US 2023/0156837 A1      May 18, 2023

(30) Foreign Application Priority Data

Apr. 27, 2020      (KR) ........................ 10-2020-0050479

(51) Int. Cl.
*H04W 72/04*      (2023.01)
*H04W 72/20*      (2023.01)
*H04W 76/14*      (2018.01)

(52) U.S. Cl.
CPC ........... *H04W 76/14* (2018.02); *H04W 72/20* (2023.01)

(58) Field of Classification Search
CPC ..... H04W 76/14; H04W 72/20; H04W 88/04; H04W 88/085; H04W 4/06; H04W 4/40;
(Continued)

(56) References Cited

U.S. PATENT DOCUMENTS 11,751,100 B2 *   9/2023   Mao .................... H04W 28/086
                                                     370/329
12,096,405 B2 *   9/2024   Wei ....................... H04L 5/0032
(Continued)

FOREIGN PATENT DOCUMENTS

JP          2005234791          9/2005
JP          2010226326          10/2010
(Continued)

OTHER PUBLICATIONS

Korean Intellectual Property Office Application No. 10-2022-7032728, Notice of Allowance dated Oct. 14, 2024, 7 pages.
(Continued)

*Primary Examiner* — Lan-Huong Truong
(74) *Attorney, Agent, or Firm* — LEE, HONG, DEGERMAN, KANG & WAIMEY

(57)      ABSTRACT

The purpose of the present disclosure is to deliver a vehicle-to-vehicle (V2V) message in a wireless communication system. An operation method of an integrated access and backhaul (LAB) node may comprise the steps of: establishing a directlink connection with a terminal; receiving data including an event message from the terminal through the directlink connection; and transmitting system information including the event message to at least one terminal.

13 Claims, 34 Drawing Sheets

(58) Field of Classification Search
CPC ....... H04W 40/22; H04W 84/04; H04W 4/46;
H04W 84/047; Y02D 30/70
See application file for complete search history.

(56) References Cited

U.S. PATENT DOCUMENTS

| | | | | |
|---|---|---|---|---|
| 2015/0310742 | A1 | 10/2015 | Albornoz | |
| 2020/0107383 | A1* | 4/2020 | Novlan | H04B 7/06952 |
| 2021/0084606 | A1* | 3/2021 | Abedini | H04W 80/02 |
| 2021/0321361 | A1* | 10/2021 | Abedini | H04W 24/10 |
| 2021/0400609 | A1* | 12/2021 | Bi | H04W 56/0015 |
| 2022/0400458 | A1* | 12/2022 | Keskitalo | H04W 56/0065 |

FOREIGN PATENT DOCUMENTS

| | | |
|---|---|---|
| KR | 1020090031486 | 3/2009 |
| KR | 1020180131553 | 12/2018 |
| KR | 1020190113819 | 10/2019 |

OTHER PUBLICATIONS

Sony, "IAB System information handling," 3GPP TSG-RAN WG2
107, R2-1909897, Aug. 2019, 4 pages.
PCT International Application No. PCT/KR2021/005190, International Search Report dated Jul. 23, 2021, 4 pages.

* cited by examiner

● : TX UE

▨ : TX UE

● : TX UE

▨ : TX UE

● : TX UE

▨ : TX UE

UE:NSA with EPC
IAB-node:NSA with EPC

UE:NSA with EPC
IAB-node:SA with NGC

UE:SA with NGC
IAB-node:SA with NGC

Device(400)

METHOD AND DEVICE FOR TRANSMITTING VEHICLE-TO-VEHICLE COMMUNICATION MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2021/005190, filed on Apr. 23, 2021, which claims the benefit of earlier filing date and right of priority to Korean Application No. 10-2020-0050479, filed on Apr. 27, 2020, the contents of which are all incorporated by reference herein in their entirety.

TECHNICAL FIELD

The present disclosure relates to a wireless communication system and, more particularly, to a method and apparatus for delivering a vehicle-to-vehicle (V2V) message in a wireless communication system.

BACKGROUND ART

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

DISCLOSURE

Technical Problem

The present disclosure relates to a method and apparatus for effectively delivering a vehicle-to-vehicle (V2V) message that is generated by a vehicle in a wireless communication system.

The present disclosure relates to a method and apparatus for delivering a V2V message by using an integrated access and backhaul (IAB) node in a wireless communication system.

The technical objects to be achieved in the present disclosure are not limited to the above-mentioned technical objects, and other technical objects that are not mentioned may be considered by those skilled in the art through the embodiments described below.

Technical Solution

As an example of the present disclosure, a method for operating an integrated access and backhaul (IAB) node in a wireless communication system may include establishing a directlink connection with a terminal, receiving data including an event message from the terminal through the directlink connection, and transmitting system information including the event message to at least one terminal.

As an example of the present disclosure, a method for operating an integrated access and backhaul (IAB) node in a wireless communication system may include receiving data from a child IAB node through a wireless backhaul link, confirming that the data includes an event message generated by a vehicle terminal, and transmitting system information including the event message to at least one terminal.

As an example of the present disclosure, a method for operating a terminal in a wireless communication system may include detecting occurrence of an event, establishing a directlink connection with an integrated access and backhaul (IAB) node, and transmitting data including an event message to the IAB node through the directlink connection.

As an example of the present disclosure, an integrated access and backhaul (IAB) node in a wireless communication system includes a transceiver and a processor coupled with the transceiver. The processor is configured to establish a directlink connection with a terminal, to receive data including an event message from the terminal through the directlink connection, and to transmit system information including the event message to at least one terminal.

As an example of the present disclosure, an integrated access and backhaul (IAB) node in a wireless communication system includes a transceiver and a processor coupled with the transceiver. The processor may be configured to receive data from a child IAB node through a wireless backhaul link, to confirm that the data includes an event message generated by a vehicle terminal, and to transmit system information including the event message to at least one terminal.

As an example of the present disclosure, a terminal in a wireless communication system includes a transceiver and a processor coupled with the transceiver. The processor may be configured to detect occurrence of an event, to establish a directlink connection with an integrated access and backhaul (IAB) node, and to transmit data including an event message to the IAB node through the directlink connection.

As an example of the present disclosure, a device may include at least one memory and at least one processor functionally coupled with the at least one memory. The at least one processor may control the device to detect occurrence of an event, to establish a directlink connection with an integrated access and backhaul (IAB) node, and to transmit data including an event message to the IAB node through the directlink connection.

As an example of the present disclosure, a non-transitory computer-readable medium storing at least one instruction may include the at least one instruction that is executable by a processor. The at least one instruction may instruct a device to detect occurrence of an event, to establish a directlink connection with an integrated access and backhaul (LAB) node, and to transmit data including an event message to the IAB node through the directlink connection.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

As is apparent from the above description, the embodiments of the present disclosure have the following effects.

According to the present disclosure, information on an event observed in a vehicle may be quickly propagated in a wireless communication system.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

MODE FOR INVENTION

Figure 1:
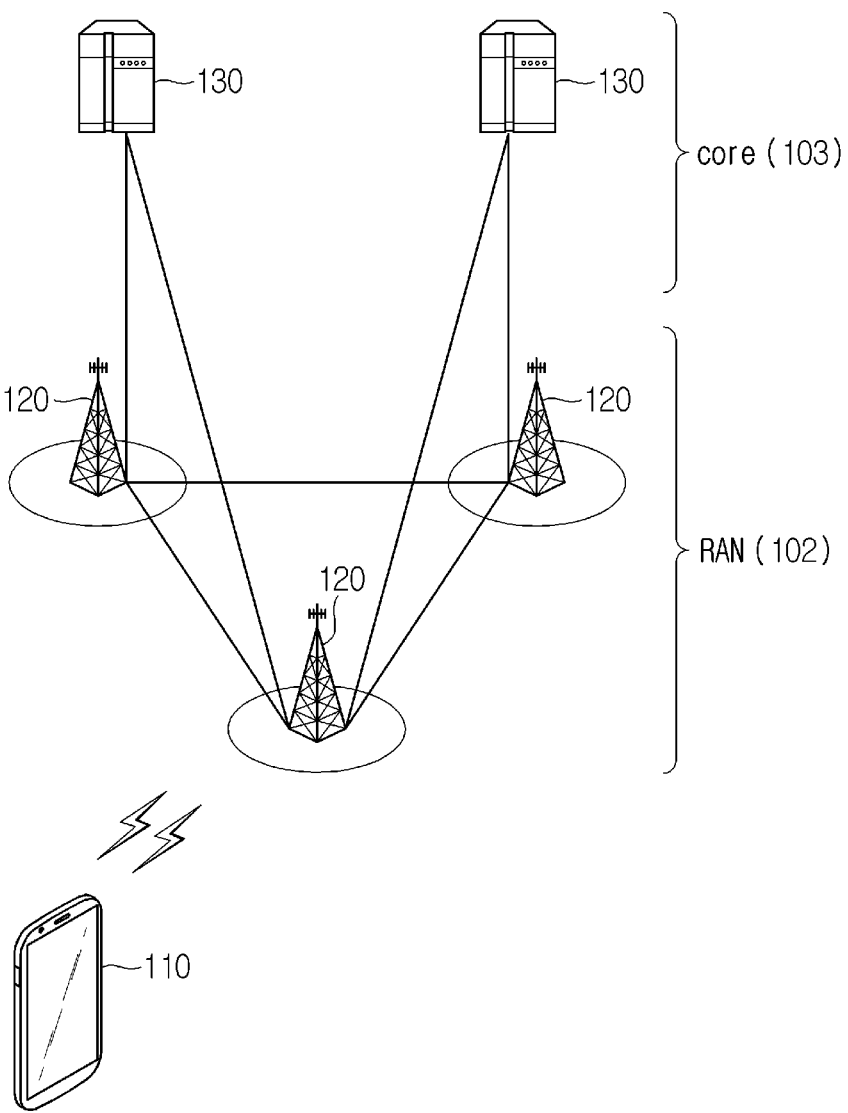
FIG. 1 illustrates a structure of a wireless communication system, in accordance with an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE
    3GPP TS 36.211: Physical channels and modulation
    3GPP TS 36.212: Multiplexing and channel coding
    3GPP TS 36.213: Physical layer procedures
    3GPP TS 36.214: Physical layer; Measurements
    3GPP TS 36.300: Overall description
    3GPP TS 36.304: User Equipment (UE) procedures in idle mode 3GPP TS 36.314: Layer 2-Measurements 3GPP TS 36.321: Medium Access Control (MAC) protocol 3GPP TS 36.322: Radio Link Control (RLC) protocol 3GPP TS 36.323: Packet Data Convergence Protocol (PDCP)

3GPP TS 36.331: Radio Resource Control (RRC) protocol (2) 3GPP NR (e.g. 5G)

3GPP TS 38.211: Physical channels and modulation

3GPP TS 38.212: Multiplexing and channel coding

3GPP TS 38.213: Physical layer procedures for control

3GPP TS 38.214: Physical layer procedures for data

3GPP TS 38.215: Physical layer measurements

3GPP TS 38.300: Overall description

3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

3GPP TS 37.324: Service Data Adaptation Protocol (SDAP)

3GPP TS 37.340: Multi-connectivity; Overall description

Communication System Applicable to the Present Disclosure

FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
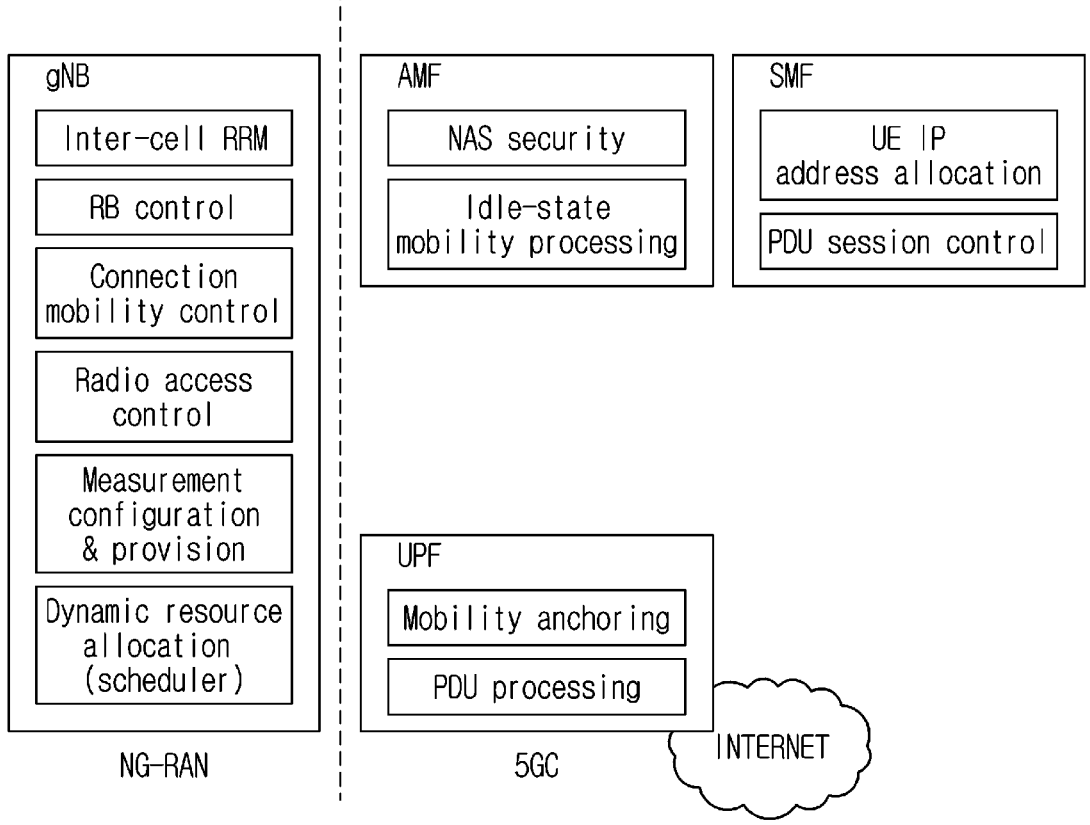
FIG. 2 illustrates a functional division between an NG-RAN and a SGC, in accordance with an embodiment of the present disclosure.

FIG. 2 illustrates a functional division between an NG-RAN and a 5GC, in accordance with an embodiment of the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

Figure 3A:
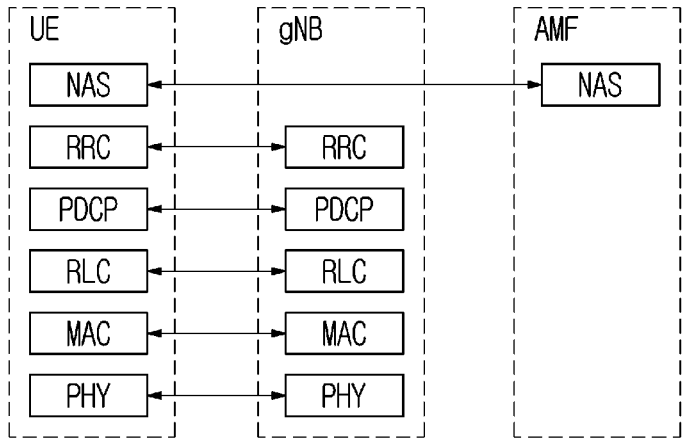
FIGS. 3A and 3B illustrate a radio protocol architecture, in accordance with an embodiment of the present disclosure.
Figure 3B:
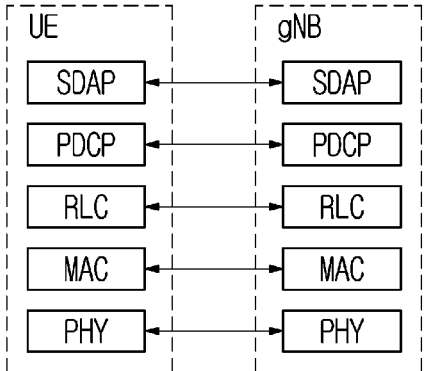

FIGS. 3A and 3B illustrate a radio protocol architecture, in accordance with an embodiment of the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Referring to FIGS. 3A and 3B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PI-TY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Radio Resource Structure

Figure 4:
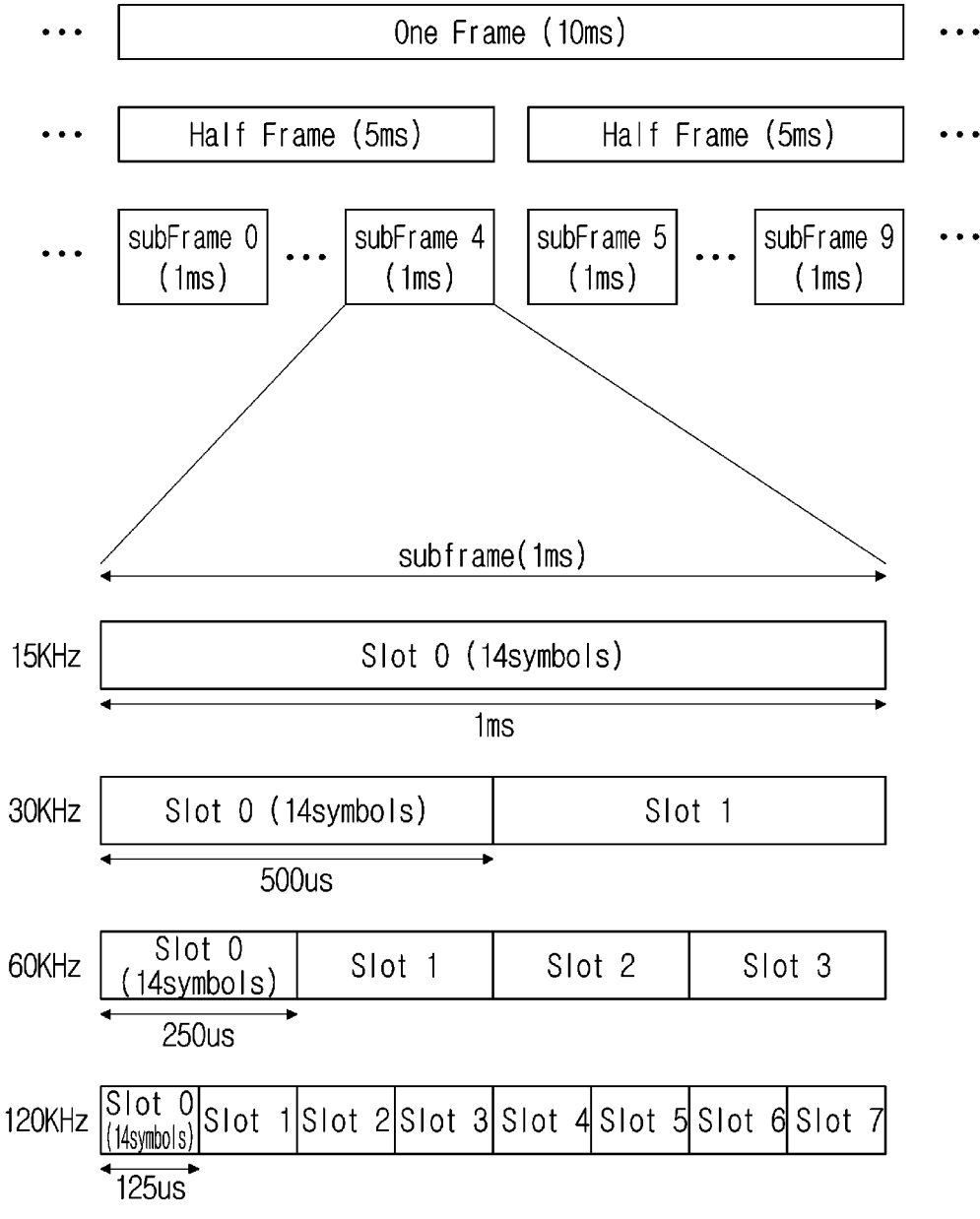
FIG. 4 illustrates a structure of a radio frame in an NR system, in accordance with an embodiment of the present disclosure.

FIG. 4 illustrates a structure of a radio frame in an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In a case where a normal CP is used, a number of symbols per slot ($N^{slot}_{symb}$), a number slots per frame ($N^{frame,\mu}_{slot}$), and a number of slots per subframe ($N^{subframe,\mu}_{slot}$) may be varied based on an SCS configuration ($\mu$). For instance, SCS(=15*2$^\mu$), $N^{slot}_{symb}$, $N^{frame,\mu}_{slot}$ and $N^{subframe,\mu}_{slot}$ are 15 KHz, 14, 10 and 1, respectively, when $\mu$=0, are 30 KHz, 14, 20 and 2, respectively, when $\mu$=1, are 60 KHz, 14, 40 and 4, respectively, when $\mu$=2, are 120 KHz, 14, 80 and 8, respectively, when $\mu$=3, or are 240 KHz, 14, 160 and 16, respectively, when $\mu$=4. Meanwhile, in a case where an extended CP is used, SCS (=15*2$^\mu$), $N^{slot}_{symb}$, $N^{frame,\mu}_{slot}$ and $N^{subframe,\mu}_{slot}$ are 60 KHz, 12, 40 and 2, respectively, when $\mu$=2.

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, frequency ranges corresponding to the FR1 and FR2 may be 450 MHz-6000 MHz and 24250 MHz-52600 MHz, respectively. Further, supportable SCSs is 15, 30 and 60 kHz for the FR1 and 60, 120, 240 kHz for the FR2. Among the frequency ranges that are used in an NR system, FR1 may mean a "sub 6 GHz range", and FR2 may mean an "above 6 GHz range" and may also be referred to as a millimeter wave (mmW).

As described above, the values of the frequency ranges in the NR system may be changed (or varied). For example, comparing to examples for the frequency ranges described above, FR1 may be defined to include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

Figure 5:
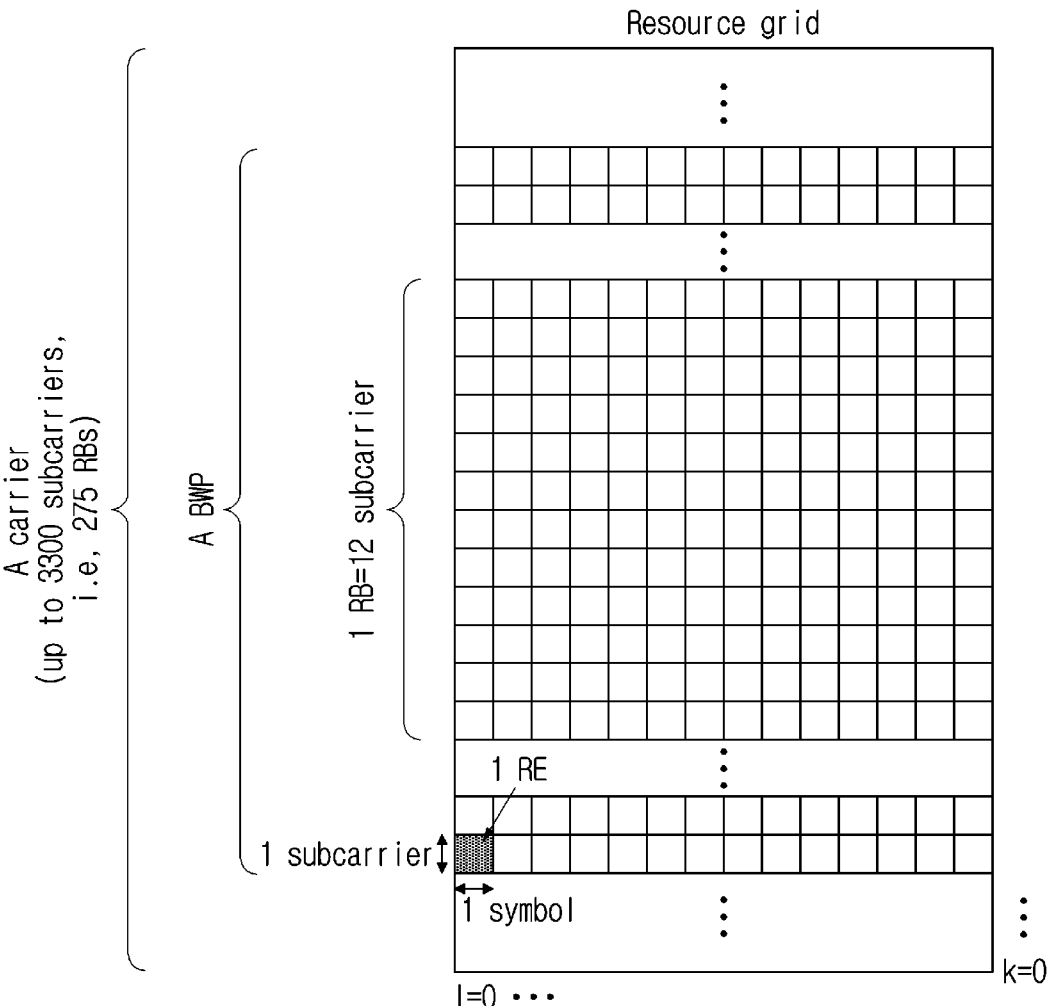
FIG. 5 illustrates a structure of a slot in an NR frame, in accordance with an embodiment of the present disclosure.

FIG. 5 illustrates a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Bandwidth Part (BWP)

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit a Physical Uplink Control Channel (PUCCH) or a Physical Uplink Shared Channel (PUSCH) outside an active UL BWP. For example, in a downlink case, the initial BWP may be given as a consecutive RB set for a remaining minimum system information (RMSI) control resource set (CORESET) (configured by PBCH). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

Figure 6:
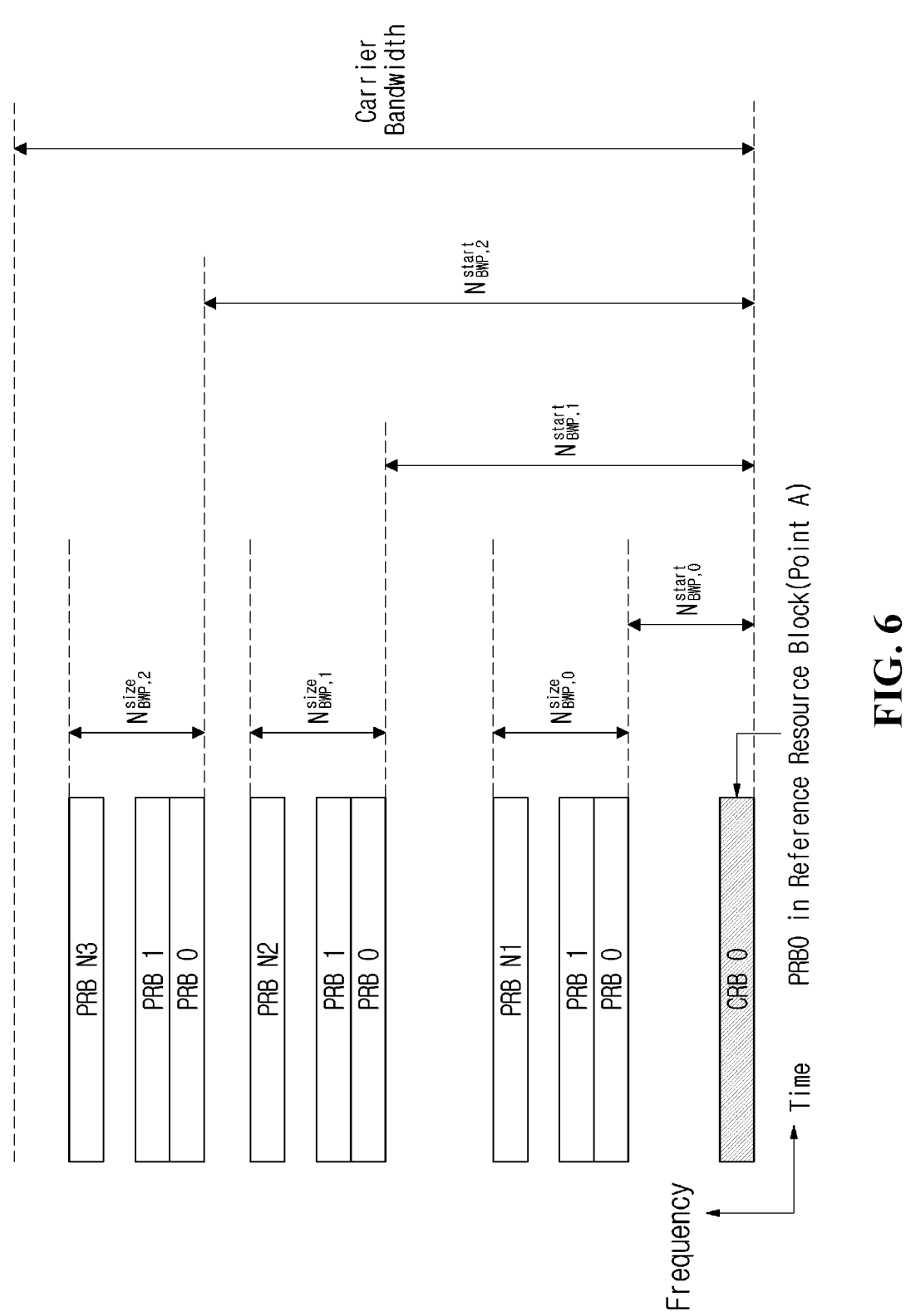
FIG. 6 illustrates an example of a BWP, in accordance with an embodiment of the present disclosure.
Figure 7A:
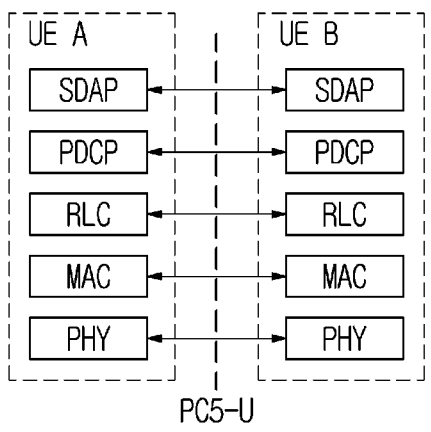
FIGS. 7A and 7B illustrate a radio protocol architecture for a SL communication, in accordance with an embodiment of the present disclosure.
Figure 7B:
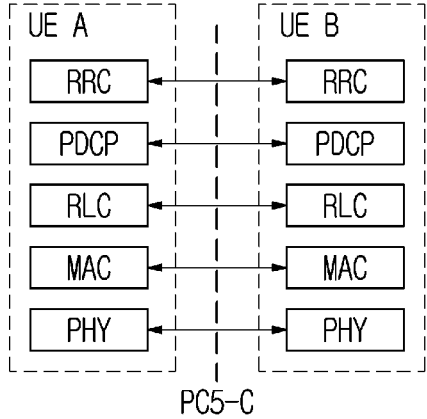

FIG. 6 illustrates an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset (NstartBWP) from the point A, and a bandwidth (Nsize- Synchroniztion Acquistion of SL Terminal In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 8:
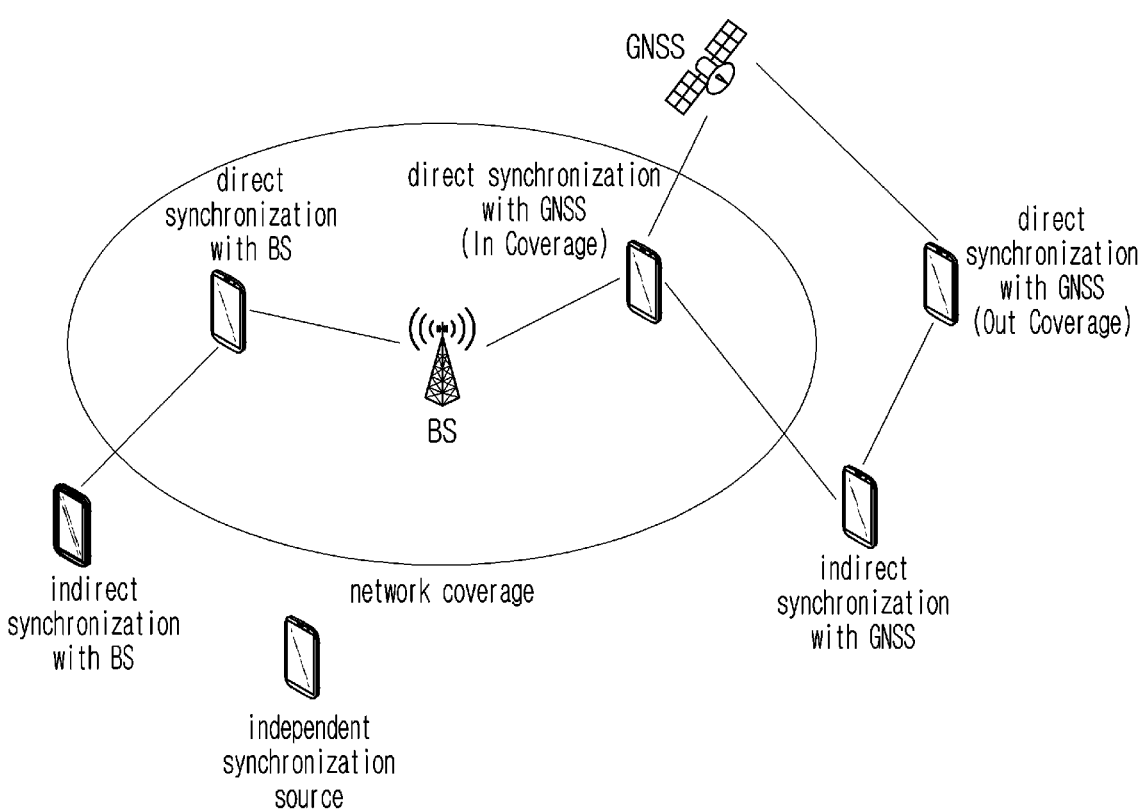
FIG. 8 illustrates a synchronization source or synchronization reference of V2X, in accordance with an embodiment of the present disclosure.

FIG. 8 illustrates a synchronization source or synchronization reference of V2X, in accordance with an embodiment of the present disclosure. The embodiment of FIG. 8 may be combined with various embodiments of the present disclosure.

Referring to FIG. 8, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre) determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |

TABLE 2-continued

| Priority Level | GNSS-based synchronization | eNB/gNB-based synchronization |
|---|---|---|
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre) determined. In a single-carrier operation, the UE may derive its transmission timing from an available synchronization reference with the highest priority.

For example, the UE may (re) select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 9A:
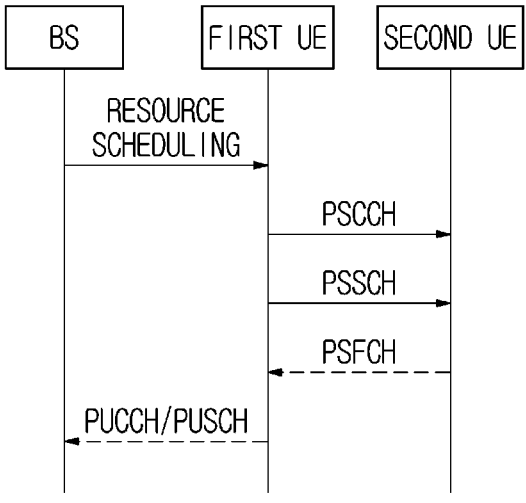
FIGS. 9A and 9B illustrate a procedure of performing V2X or SL communication by a terminal based on a transmission mode, in accordance with an embodiment of the present disclosure.
Figure 9B:
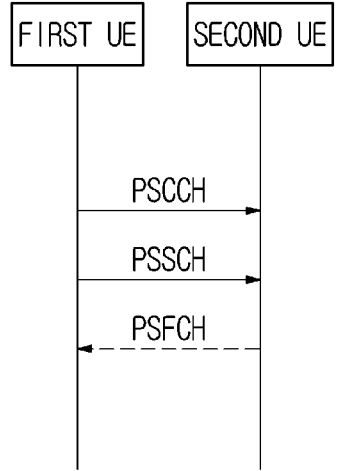

FIGS. 9A and 9B illustrate a procedure of performing V2X or SL communication by a terminal based on a transmission mode, in accordance with an embodiment of the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 9A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 9A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

Subsequently, the first UE may transmit a PSCCH (e.g., sidelink control information (SCI) or 1st-stage SCI) to a second UE based on the resource scheduling. After then, the first UE may transmit a PSSCH (e.g., 2nd-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

| 3GPP TS 38.212 |
| --- |

■ Format 3_0
DCI format 3_0 is used for scheduling of NR PSCCH and NR PSSCH in one cell.
The following information is transmitted by means of the DCI format 3_0 with CRC scrambled by SL-RNTI or SL-CS-RNTI:
  - Resource pool index -[log!] bits, where J is the number of resource pools for transmission configured by the higher layer parameter sl-TxPoolScheduling.
  - Time gap - 3 hits determined by higher layer parameter sl-DCI-ToSL-Trans, as defined in clause 8.1.2.1 of [6, TS 38.211]
  - HARQ process number - 4 bits as defined in clause 16.4 of 15, TS 38.2131
  - New data indicator - 1 hit as defined in clause 16.4 of 15, TS 38.213]

- Lowest index of the subchannel allocation to the initial transmission $-\lceil \log_2(N^{SL}_{subChannel}) \rceil$ bits as defined in clause 8.1.2.2 of Id, TS 38.214 1
  - SCI format 1-A fields according to clause 8.3. 1.1:
    - Frequency resource assignment.
    - Time resource assignment.
  - PSFCH-to-HARQ feedback tinting indicator - [$\log_2 N_{fb\_timing}$] bits, where $N_{fb\_timing}$ is the number of entries in the higher layer parameter sl-PSFCH-ToPUCCH, as defined in clause 16.5 of [5 TS 38.213]
  PUCCH resouree indicator - 3 bits as defined in clause 16.5 of [5, TS 38.213].
  - Configuration index - 0 bit if the UE is not configured to monitor DCI format 3_0 with CRC scrambled by SL-CS-RNTI: otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.
  - Counter sidelink assignment index - 2 bits
    - 2 bits as defined in clause 16.5.2 of [5, TS 38.213] if the UE is configured with pdsch-HARQ-ACK-Codebook = dynamic
    - 2 bits as defined in caluse 16.5.1 of [5, TS 38.213] if the UE is configured with pdsch-HARQ-ACK-Codebook = semi-static
  - Padding bits, if required
■ Format 3_1
DCI format 3_1 is used for scheduling of LTE PSCH and LTE PSSCH in one cell.
The following information is transmitted by means of the DCI format 3_1 with CRC scrambled by SL-L-CS-RNTI:
  - Timing offset - 3 bits determined by higher layer parameter sl-TimeOffsetEUTRA, as defined in caluse 16.6 of [5, TS 38.213]
  - Carrier indicator - 3 bits as defined in 5.3.3.1.9A of [11. TS 36.212].

- Lowest index of the subchannel allocation of the initial transmission $-\lceil \log_2(N^{SL}_{subchannel}) \rceil$ bits as defined in 5.3.3.1.9A of [11. TS 36.212].
  - Frequency resource location transmission and retransmission, as defined in 5.3.3.1.9A of [11, TS 36.212]

TABLE 4-continued

| 3GPP TS 38.212 |
| --- |

- Time gap between inital transmission and retransmission, as defined in 5.3.3.1.9A of
[11, TS 36.212]
  - SL index - 2 bits as defined in 5.3.3.1.9A of [11, TS 36.212]
  - SL SPS configuration index - 3 bits defined in clause 5.3.3.1.9A of [11, TS 36.212].
  - Activation/release indication - 1 bit as defined in clause 5.3.3.1.9A of [11, TS 36.212].

Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re) selection procedure. For example, the sensing may be performed in unit of subchannel(s). For example, subsequently, a first UE which has selected resource(s) from a resource pool by itself may transmit a PSCCH (e.g., sidelink control information (SCI) or 1st-stage SCI) to a second UE by using the resource(s). After then, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE.

Referring to FIGS. 9A and 9B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 5 shows an example of a 1st-stage SCI format.

TABLE 5

| 3GPP TS 38.212 |
| --- |

SCI format 1-A
SCI format 1-A is used for the scheduling of PSSCH and $2^{nd}$-stage-SCI on PSSCH
The following information is transmitted by means of the SCI format 1-A:
  Priority - 3 bits as specified in clause 5.4.3.3 of [12, TS 23.287] and clause 5.22.1.3.1
  of [8, TS 38.321].

Frequency resource assignment $-\left\lceil \log_2\left(\dfrac{N_{subChannel}^{SL}\left(N_{subChannelSL}^{SL} + 1\right)}{2}\right)\right\rceil$ bits when the value of the higher layer parameter sl-MaxNumPerReserve is configured to 2; otherwise $\left\lceil \log_2\left(\dfrac{N_{subChannel}^{SL}\left(N_{subChannel}^{SL} + 1\right)\left(2N_{subChannel}^{SL} + 1\right)}{6}\right)\right\rceil$ bits when the value of the higher layer parameter sl-MaxNumPerReserve is configured to 3, as defined in clause
  8.1.2.2 of [6, TS 38.214].
  Time resource assignment - 5 bits when the value of the higher layer parameter sl-
  MaxNumPerReserve is configured to 2; otherwise 9 bits when the value of the higher
  layer parameter sl-MaxNumPerReserve is configured to 3, as defined in clause 8.1.2.1
  of [6, TS 38.214].
  Resource reservation period - $\lceil \log_2 N_{rsv\_period}\rceil$ bits as defined in clause 8.1.4 of [6, TS
  38.214], where $N_{rsv\_period}$ is the number of entries in the higher layer parameter sl-
  ResourceReservePeriodList, if higher layer parameter sl-MultiReserveResource is
  configured: 0 bit otherwise.
  DMRS pattern - $\lceil \log_2 N_{pattern}\rceil$ bits as defined in clause 8.4.1.1.2 of [4, TS 38.211],
  where $N_{pattern}$ is the number of DMRS patterns configured by higher layer parameter
  sl-PSSCH-DMRS-TimePatternList.
  $2^{nd}$-stage SCI format - 2 bits as defined in Table 8.3.1.1-1.
  Beta_offset indicator - 2 bits as provided by higher layer parameter sl-
  BetaOffsets2ndSCI and Table 8.3.1.1-2.
  Number of DMRS port - 1 bit as defined in Table 8.3.1.1-3.
  Modulation and coding scheme - 5 bits as defined in clause 8.1.3 of [6, TS 38.214].
  Additional MCS table indicator - as defined in clause 8.1.3.1 of [6, TS 38.214]: 1 bit if
  one MCS table is configured by higher layer parameter sl-Additional-MCS-Table; 2
  bits if two MCS tables are configured by higher layer parameter sl-Additional-MCS-
  Table; 0 bit otherwise.

TABLE 5-continued

| 3GPP TS 38.212 |
| --- |

PSFCH overhead indication - 1 bit as defined clause 8.1.3.2 of [6, TS 38.214] if higher layer parameter sl-PSFCH-Period = 2 or 4; 0 bit otherwise.
Reserved - a number of bits as determined by higher layer parameter sl-NumReservedBits, with value set to zero.

Table 8.3.1.1-1: $2^{nd}$-stage SCI formats

| Value of 2nd-stage<br>SCI format field | 2nd-stage SCI format |
| --- | --- |
| 00 | SCI format 2-A |
| 01 | SCI format 2-B |
| 10 | Reserved |
| 11 | Reserved |

Table 8.3.1.1-2: Mapping of Beta_offset indicator values to indexes in—
Table 9.3-2 of [5, TS38.213]

| Value of Beta_—offset<br>indicator | Beta_offset index in Table 9.3-2 of<br>[5, TS38.213] |
| --- | --- |
| 00 | 1st index provided by higher layer parameter<br>sl-BetaOffsets2ndSCI |
| 01 | 2nd index provided by higher layer parameter<br>sl-BetaOffsets2ndSCI |
| 10 | 3rd index provided by higher layer parameter<br>sl-BetaOffsets2ndSCI |
| 11 | 4th index provided by higher layer parameter<br>sl-BetaOffsets2ndSCI |

TABLE 6

| 3GPP TS 38.212 |
| --- |

SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
  HARQ process number - 4 bits as defined in clause 16.4 of [5, TS 38.213].
  New data indicator - 1 bit as defined in clause 16.4 of [5, TS 38.213].
  Redundancy version - 2 bits as defined in clause 16.4 of [6, TS 38.214].
  Source ID - 8 bits as defined in clause 8.1 of [6, TS 38.214].
  Designation ID - 16 bits as defined in clause 8.1 of [6, TS 38.214].
  HARQ feedback enabled/disabled indicator - 1 bit as defined in clause 16.3 of [5, TS 38.213].
  Cast type indicator - 2 bits as defined in Table 8.4.1.1-1.
  CSI request - 1 bit as defined in clause 8.2.1 of [6, TS 38.214].

Table 8.4.1.1-1: Cast type indicator

| Value of Cast type<br>indicator | Cast type |
| --- | --- |
| 00 | Broadcast |
| 01 | Groupcast<br>when HARQ-ACK information<br>includes ACK or NACK |
| 10 | Unicast |
| 11 | Groupcast<br>when HARQ-ACK information<br>includes only NACK |

SCI format 2-B
SCI format 2-B is used for the decoding of PSSCH, with HARQ operation when HARQ-ACK information only NACK, or when there is no feedback of HARQ-ACK information.
The following information is transmitted by means of the SCI format 2-B:
  HARQ process number - 4 bits as defined in clause 16.4 of [5, TS 38.213].
  New data indicator - 1 bit as defined in clause 16.4 of [5, TS 38.213].
  Redundancy version - 2 bits as defined in clause 16.4 of [6, TS 38.214].
  Source ID - 8 bits as defined in clause 8.1 of [6, TS 38.214].
  Designation ID - 16 bits as defined in clause 8.1 of [6, TS 38.214].

TABLE 6-continued

3GPP TS 38.212

HARQ feedback enabled/disabled indicator - 1 bit as defined in clause 16.3 of
[5, TS 38.213].
  Zone ID - 12 bits as defined in clause 5.8.11 of [9, TS 38.331].
    Communication range requirement - 4 bits determined by higher layer parameter
sl-ZoneConfigMCR-Index.

Referring to FIGS. 9A and 9B, the first UE may receive the PSPCH based on Table 7. For example, the first UE and the second UE may determine a PSFCH resource based on Table 7, and the second UE may transmit HARQ feedback to the first UE using the PSPCH resource.

TABLE 7

3GPP TS 38.213

■ UE procedure for reporting HARQ-ACK on sidelink
A UE can be indicated by an SCI format scheduling a PSSCH reception, in one or more subchannels from a number of $N_{subch}^{PSSCH}$ sub-channels, to transmit a PSFCH with HARQ-ACK information in response to the PSSCH reception. The UE provides HARQ-ACK information
that includes ACK or NACK, or only NACK.
A UE can be provided, by sl-PSFCH-Period-r16, a number of slots in a resource pool for a
period of PSFCH transmission occasion resources. If the number is zero, PSFCH
transmissions from the UE in the resource pool are disabled.

A UE expects that a slot $t_{l_k}^{SL}$   $(0 \le k < T'_{max})$ has a PSFCH transmission occasion resource if k mod $N_{PSSCH}^{PSSCH} = 0,$   where $t_{l_k}^{SL}$   is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.
A UE may be indicated by higher layers to not transmit a PSFCH in response to a PSSCH
reception [11, TS 38.321],
If a UE receives a PSSCH in a resource pool and the HARQ feedback enabled/disabled
indicator field in an associated SCI format 2-A or a SCI format 2-B has value 1 [5, TS
38.212] the UE provides the HARQ-ACK information in a PSFCH transmisson in the
resource pool. The UE transmits the PSFCH in a first slot that includes PSFCH resources
and is at least a number of slots, provided by sl-MinTimeGapPSFCH-r16, of the resource
pool after a last slot of the PSSCH reception.

A UE is provided by sl-PSFCH-RB-Set-r16 a set of $M_{PRB,set}^{PSFCH}$   PRBs in a resource pool for PSFCH transmission in a PRB of the resource pool. For a number of $N_{subch}$ sub-channels for
the resource pool, provided by sl-NumSubchannel, and a number of PSSCH slots associate with a PSFCH slot that is less than or equal to $N_{PSSCH}^{PSFCH}$,   the UE allocates the $$\left[\left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subch,slot}^{PSFCH} - 1\right] \quad \text{the UE allocates the PRBs from the}$$

$M_{PRB,set}^{PSFCH}$

PRBs to slot i among the PSSCH slots associated with the PSFCH slot and sub-channel j, where $$M_{subch,slot}^{PSFCH} = M_{PRB,set}^{PSFCH} / \left(N_{subch} \cdot N_{PSSCH}^{PSFCH}\right), 0 \le i < N_{PSSCH}^{PSFCH}, 0 \le j < N_{subch},$$

and the allocation starts in an ascending order of i and coutinues in an ascending order of j. The UE expects that $M_{PRB,set}^{PSFCH}$   is a multiple of $N_{subch} \cdot N_{PSSCH}^{PSFCH}$.

A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ TABLE 7-continued

| 3GPP TS 38.213 |
|---| where $N_{CS}^{PSFCH}$ is a number of cyclic shift pairs for the resource pool and, based on an indication by higher layers, $-N_{type}^{PSFCH} = 1$ $M_{subch,slot}^{PSFCH}$ and the PRBs are associated with the starting sub-channel of the corresponding PSSCH $-N_{type}^{PSFCH} = N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding PSSCH The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the
identity of the UE receiving the PSSCH as indicated by higher layers if the UE detects a SCI
format 2-A with Cast type indicator field value of "01"; otherwise. $M_{ID}$ is zero.
A UE determines a $m_0$ value, for computing a value of cyclic shift $\alpha$ [4, TS 38.211], from a
cyclic shift pair index corresponding to a PSFCH resource index and from $N_{CS}^{PSFCH}$ using
Table 16.3-1

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift $\alpha$ [4, TS 38.211], as in
Table 16.3-2 if the UE detects a SCI format 2-A with Cast type indicator field value of "01"
or "10", or as in Table 16.3-3 if the UE detects a SCI format 2-B or a SCI format 2-A with
Cast type indicator field value of "11". The UE applies one cyclic shift from a cyclic shift pair
to a sequence used for the PSFCH transmission [4, TS 38,211].

Table 16.3-2: Mapping of HARQ-ACK information bit values to a cyclic shift, from a cyclic
shift pair, of a sequence for a PSFCH transmission when HARQ-ACK information includes
ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic
shift pair, of a sequence for a PSFCH transmission when HARQ-ACK information includes
only NACK

| HARQ-ACK Value | 0 (NACK) | 1 (ACK) |
|---|---|---|
| Sequence cyclic shift | 0 | N/A |

Referring to FIG. 9A, the first UE may transmit SL HARQ feedback to the base station through the PUCCH and/or the PUSCH based on Table 8.

TABLE 8

| 3GPP TS 38.213 |
| --- |

16.5 UE procedure for reporting HARQ-ACK on uplink
A UE can be provided PUCCH resource or PUSCH resources [12, TS 38.331]
to report HARQ-ACK information that the UE generates based on HARQ-ACK
information that the UE obtains from PSFCH receptions, or from absence of PSFCH
receptions. The UE reports HARQ-ACK information on the primary cell of the PUCCH
group, as described in Clause 9, of the cell where the UE monitors PDCCH for detection
of DCI fromat 3_0.
For SL configured grant Type 1 or Type 2 PSSCH transmission by a UE within a time period
provided by sl-PeriodCG, the UE generates one HARQ-ACK information bit in response to
the PSFCH receptions to multiplex in a PUCCH transmission occasion that is after a last
time resource, in a set of time resources.
For PSSCH transmissons scheduled by a DCI format 3_0, a UE generates HARQ-ACK
information in response to PSFCH receptions to multiplex in a PUCCH transmission occasion
that is after a last time resource in a set of time resources provided by the DCI format 3_0.
For each PSFCH reception occasion, from a number of PSFCH reception occasions, the UE
can be indicated by SCI format to perform one of the following and the UE constructs a
HARQ-ACK codeword with HARQ-ACK information, when applicable
   if the UE receives a PSFCH associated with a SCI format 2-A with Cast type indicator
   field value of "10"
      generate HARQ-ACK information with same value as a value HARQ-ACK
      information the UE determines from a PSFCH reception in the PSFCH reception
      occasion and, if the UE determines that a PSFCH is not received at the PSFCH reception
      occasions, generate NACK
   if the UE recieves a PSFCH associated with a SCI format 2-A with Cast type indicator
   field value of "01"
      generate ACK if the UE determines ACK from at least one PSFCH reception
      occasion, from the number of PSFCH reception occasions, in PSFCH resources
      corresponding to every identity $M_{ID}$ of the UEs that the UE expects to receive the
      PSSCH, as described in Clause 16.3; otherwise, generate NACK
   if the UE receives a PSFCH-associated with a SCI format 2-B or a SCI format 2-A with
   Cast type indicator field value of "11"
      generate ACK when the UE determines absense of PSFCH reception for each
      PSFCH recpetion occasion from the number of PSFCH reception occasions:
      otherwise, generate NACK
After a UE transmits PSSCHS and receives PSFCHs in corresponding PSFCH resource
occasions, the priority value of HARQ-ACK information is same as the priority value of the
PSSCH transmissions that is associated with the PSFCH reception occasions providing the
HARQ-ACK information.
The UE generates a NACK when, due to prioritization, as described in Clause 16.2.4, the UE
does not receive PSFCH in any PSFCH reception occasion associated with a PSSCH
transmission in a resource provided by a DCI format 3_0 with CRC scrambled by a SL-RNTI
or, for a configured grant, in a resource provided in a single period and for which the UE is
provided a PUCCH resource to report HARQ-ACK information. The prority value of the
NACK is same as the priority value of the PSSCH transmission.
The UE generates a NACK when, due to prioritization as described in Clause 16.2.4, the UE
does not transmit a PSSCH in any of the resources provided by a DCI format 3_0 with CRC
scrambled by SL-RNTI or, for a configured grant, in any of the resources provided in a single
period and for which the UE is provided a PUCCH resource to report HARQ-ACK
information.
The priority value of the NACK is same as the priority value of the PSSCH that was not
transmitted due to prioritization.
The UE generates an ACK if the UE does not transmit a PSCCH with a SCI format 1-A
scheduling a PSSCH in any of the resources provided by a configured grant in a single period
and for which the UE is provided a PUCCH resource to report HARQ-ACK information. The
priority value of the ACK is same as the largest priority value among the possible priority
values for the configured grant.
A UE does not expect to be provided PUCCH resources or PUSCH resources to report
HARQ-ACK information that start earlier than $(N + 1) \cdot (2048 + 144) \cdot \kappa \cdot 2^{\mu} \cdot T_C$ after the end
of a last symbol of a last PSFCH reception occasion, from a number of PSFCH reception
occasions that the UE generates HARQ-ACK information to report in a PUCCH or PUSCH
transmission, where
   $\kappa$ and Tc are defined in [4, Ts 38.211]
   $\mu = \min(\mu_{SL}, \mu_{UL})$, where $\mu_{SL}$ is the SCS configuration of the SL BWP and $\mu_{UL}$ is the SCS
   configuration of the active UL BWP on the primary cell
   N is determined from $\mu$ according to Table 16.5-1

TABLE 8-continued

| 3GPP TS 38.213 |
|---|

| Table 16.5-1: Values of N | |
|---|---|
| μ | N |
| 0 | 14 |
| 1 | 18 |
| 2 | 28 |
| 3 | 32 |

With reference to slots for PUCCH transmissions and for a number of PSFCH reception
occasions ending in slot n, the UE provides the generated HARQ-ACK information in a
PUCCH transmission within sloot n + κ, subbject to the overlapping conditions in Clause 9.2.5,
where κ is a number of slots indicated by a PSFCH-to-HARQ_feedback timing indicator
field, if present, in a DCI format indicating a slot for PUCCH transmission to report the HARQ-
ACK information, or κ is provided by sl-PSFCH-ToPUCCH-CG-Type1-r16. k = 0
corresponds to a last slot for a PUCCH transmission that would overlap with the last PSFCH
reception occasion assuming that the start of the sidelink frame is same as the start of the
downlink frame [4, TS 38.211].
For a PSSCH trasnmission by a UE that is scheduled by a DCI format, or for a SL configured
grant Type 2 PSSCH transmission activated by a DCI format, the DCI format indicates to the
UE that a PUCCH resource is not provided when a value of the PUCCH resource indicator
field is zero and a value of PSFCH-to-HARQ feedback timing indicator field, if present, is
zero. For a SL, configured grant Type 1 PSSCH transmission, a PUCCH resource can be
provided by sl-N1PUCCH-AN-r16 and sl-PSFCH-ToPUCCH-CG-Type1-r16. If a PUCCH
resource is not provided, the UE does not transmit a PUCCH with generated HARQ-ACK
information from PSFCH reception occasions.
For a PUCCH transmission with HARQ-ACK information, a UE determines a PUCCH resource
after determining a set of PUCCH resources for $O_{UCI}$ HARQ-ACK information bits, as
described in CLause 9.2.1. The PUCCH resource determination is based on a PUCCH resource
indicator field [5, TS 38.212] in a last DCI format 3_0, among the DCI formats 3_0 that have
a value of a PSFCH-to-HARQ_feedback timing indicator field indicating a same slot for the
PUCCH transmission, that the UE detects and for which the UE transmits corresponding
HARQ-ACK information in the PUCCH where, for PUCCH resource determination, detected
DCI formats are indexed in an ascending order across PDCCH monitoring indexes.
A UE does not expect to muliplex HARQ-ACK information for more than one SL configured
grants in a same PUCCH.
A priority value of a PUCCH transmission with one or more sidelink HARQ-ACK information
bits is the smallest priority value for the one or more HARQ-ACK information bits.
In the following. The CRC for DCI format 3_0 is scrambled with a SL-RNTI or a SL-CS-RNTI.

Figure 10A:
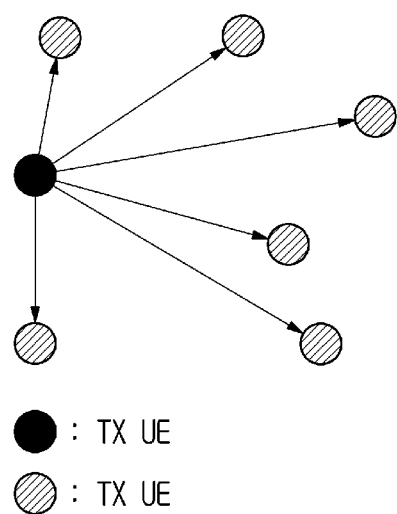
FIGS. 10A to 10C illustrate three cast types, in accordance with an embodiment of the present disclosure.
Figure 10B:
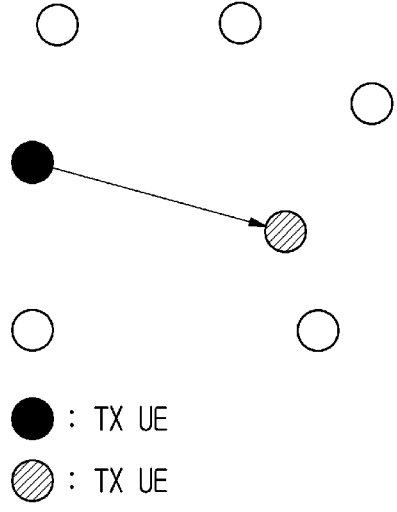
Figure 10C:
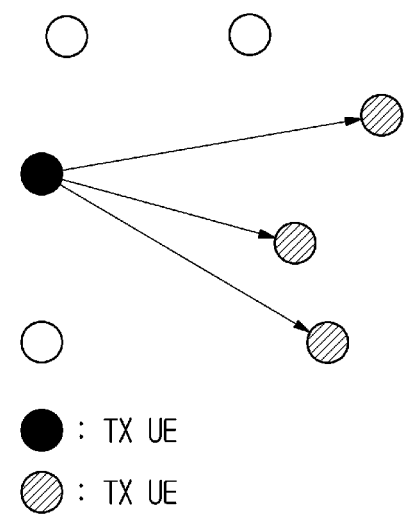

FIGS. 10A to 10C illustrate three cast types applicable to the present disclosure. The embodiment of FIGS. 10A to 10C may be combined with various embodiments of the present disclosure.

Specifically, FIG. 10A exemplifies broadcast-type SL communication, FIG. 10B exemplifies unicast type-SL communication, and FIG. 10C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 11:
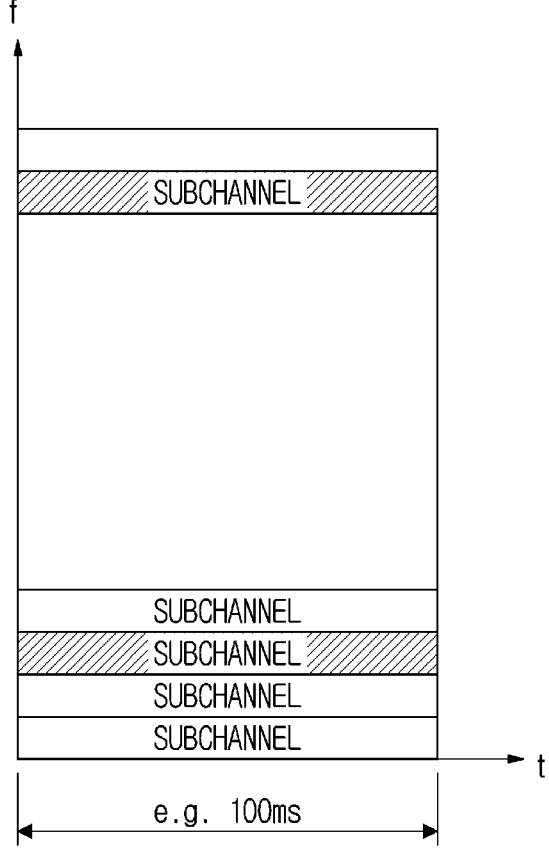
FIG. 11 illustrates a resource unit for channel busy ratio (CBR) measurement, in accordance with an embodiment of the present disclosure.

FIG. 11 illustrates resource units for CBR measurement applicable to the present disclosure. The embodiment of FIG. 11 may be combined with various embodiments of the present disclosure.

Referring to FIG. 11, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 11, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

An example of SL CBR and SL RSSI is as follows. In the description below, the slot index may be based on a physical slot index.

A SL CBR measured in slot n is defined as the portion of sub-channels in the resource pool whose SL RSSI measured by the UE exceed a (pre-) configured threshold sensed over a CBR measurement window [n−a, n−1]. Herein, a is equal to 100 or 100·2μ slots, according to higher layer parameter sl-TimeWindowSizeCBR. The SL CBR is applicable for RRC_IDLE intra-frequency, RRC_IDLE inter-frequency, RRC_CONNECTED intra-frequency, or RRC_CONNECTED inter-frequency A SL RSSI is defined as the linear average of the total received power (in [W]) observed in the configured sub-channel in OFDM symbols of a slot configured for PSCCH and PSSCH, starting from the 2nd OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. The SL RSSI is applicable for RRC_IDLE intra-frequency, RRC_IDLE inter-frequency, RRC_CONNECTED intra-frequency or RRC_CONNECTED inter-frequency.

An example of an SL (Channel occupancy Ratio) is as follows. The SL CR evaluated at slot n is defined as the total number of sub-channels used for its transmissions in slots [n−a, n−1] and granted in slots [n, n+b] divided by the total number of configured sub-channels in the transmission pool over [n-a, n+b]. The SL CR is applicable for RRC_IDLE intra-frequency, RRC_IDLE inter-frequency, RRC_CONNECTED intra-frequency or RRC_CONNECTED inter-frequency. Herein, a may be a positive integer and b may be 0 or a positive integer. a and b may be determined by UE implementation with a+b+1=1000 or 1000.24 slots, according to higher layer parameter sl-TimeWindowSizeCR, b<(a+b+1)/2, and n+b shall not exceed the last transmission opportunity of the grant for the current transmission. The SL CR is evaluated for each (re)transmission. In evaluating SL CR, the UE shall assume the transmission parameter used at slot n is reused according to the existing grant(s) in slot [n+1, n+b] without packet dropping. The slot index is based on physical slot index. The SL CR can be computed per priority level. A resource is considered granted if it is a member of a selected sidelink grant as defined in TS 38.321.

IAB (Integrated Access and Backhaul) Technology

One of the potential technologies targeted to enable future cellular network deployment scenarios and applications is the support for backhaul and relay links. Backhaul and relay links enable flexible and very dense deployment of NR cells without the need for densifying the transport network proportionately.

Figure 12:
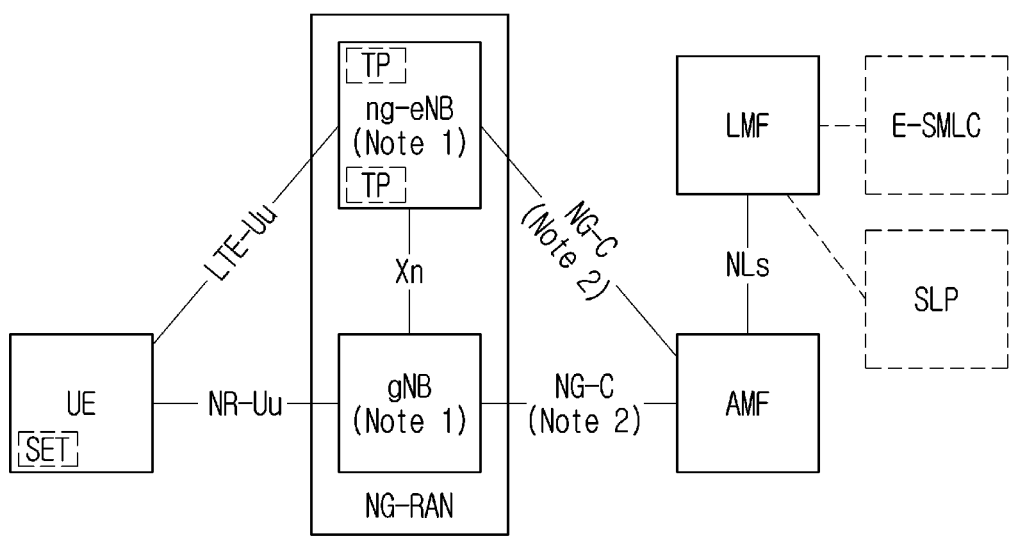
FIG. 12 illustrates an example of an integrated access and backhaul (IAB) link according to an embodiment of the present disclosure.

Due to the expected large bandwidth available for NR compared to LTE along with the native deployment of massive MIMO or multi-beam systems, NR creates an opportunity to develop integrated access and backhaul links. This allows easier deployment of a dense network of self-backhauled NR cells in a more integrated manner by building upon data channels/procedures defined for providing access to UEs. An example of an IAB network is illustrated in FIG. 12 below. FIG. 12 illustrates an example of an IAB link according to an embodiment of the present disclosure. Referring to FIG. 12, a relay node (e.g. rTRP (relay TRP)) may multiplex access and backhaul links in time, frequency, or space (e.g. beam-based operation). The following requirements and aspects may be addressed by IAB.

Figure 13:
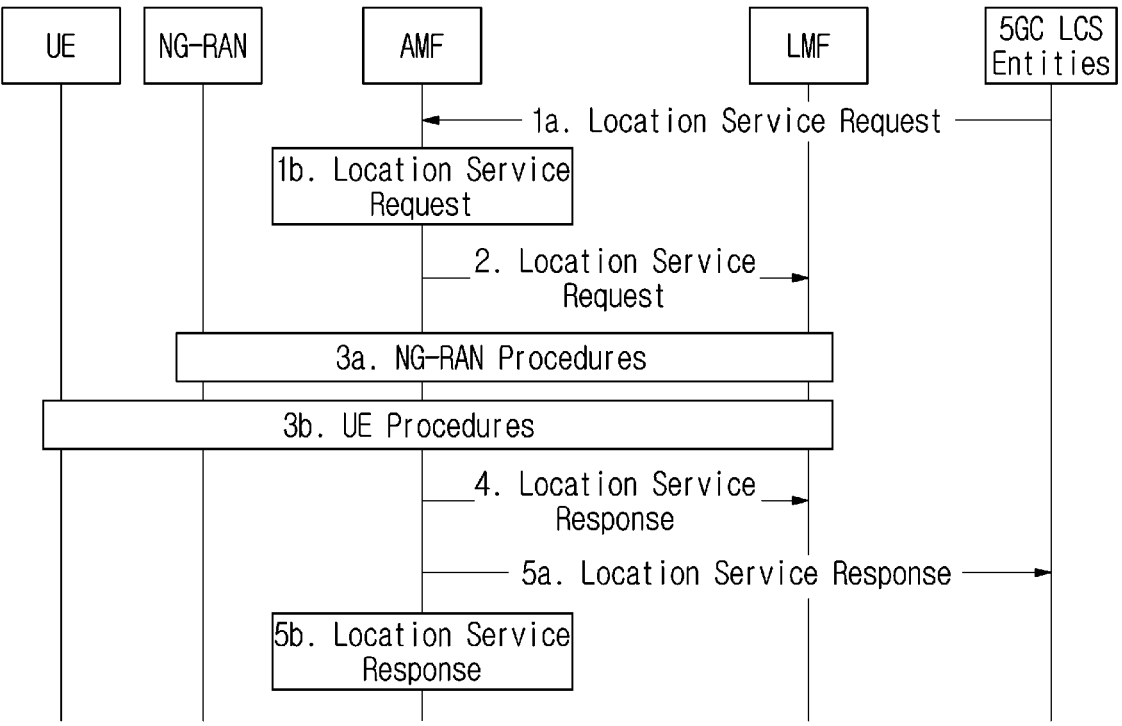
FIG. 13 illustrates another example of an IAB link according to an embodiment of the present disclosure.

Efficient and flexible operation for both inband and out-band relaying in indoor and outdoor scenarios Multi-hop connectivity End-to-end route selection and optimization Support of backhaul links with high spectral efficiency Support of legacy UEs FIG. 13 illustrates another example of an IAB link according to an embodiment of the present disclosure. Referring to FIG. 13, a relay node 1 (RN1) is connected to a donor gNB (DgNB) and a relay node 2 (RN2) is connected to the relay node 1 via wireless backhaul. That is, the donor gNB provides a backhaul link for the relay node 1 and an access link for UE1 in an integrated manner, and the relay node 1 provides a backhaul link for the relay node 2 and an access link for UE2 in an integrated manner.

Figure 14C:
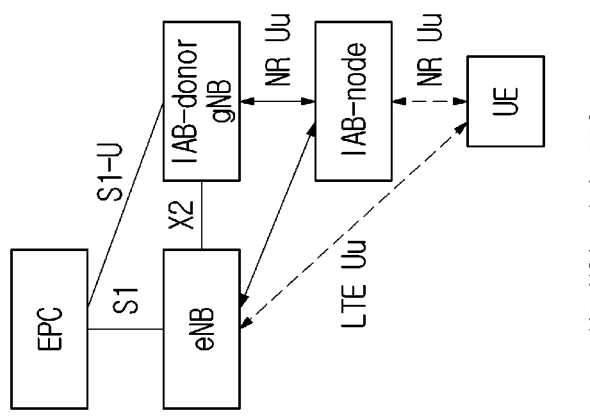
FIG. 14A to FIG. 14C illustrate examples of IAB architectures in a standalone (SA) mode and in a non-SA (NSA) mode according to an embodiment of the present disclosure.
Figure 14B:
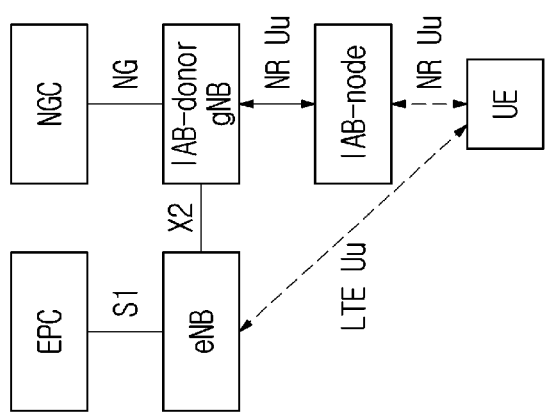
Figure 14A:
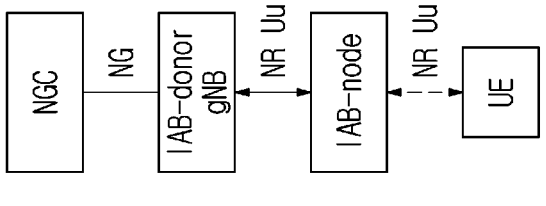

FIG. 14A to FIG. 14C illustrate examples of LAB architectures in a standalone (SA) mode and in a non-SA (NSA) mode according to an embodiment of the present disclosure. FIG. 14A exemplifies a case of SA mode, FIG. 14B exemplifies a case in which a UE operates in NSA mode and an IAB node operates in NGC mode, and FIG. 14C exemplifies a case in which a UE and an IAB node operate in NSA mode.

Referring to FIG. 14A to FIG. 14C, an IAB node may operates in SA mode or in NSA mode. When operating in NSA mode, the IAB node may use only an NR link for backhauling. The UE may be connected to more types of core networks than the IAB node.

Figure 15A:
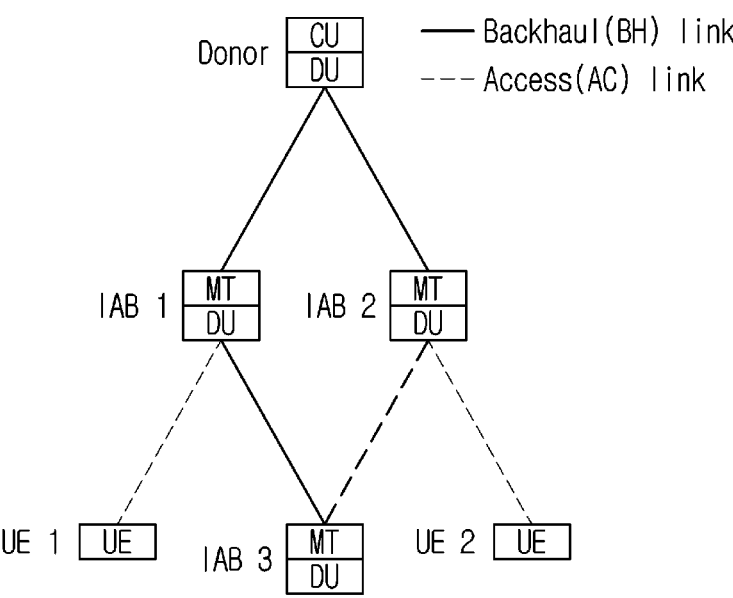
FIG. 15A and FIG. 15B illustrate a connection structure of an IAB node and an IAB donor according to an embodiment of the present disclosure.
Figure 15B:
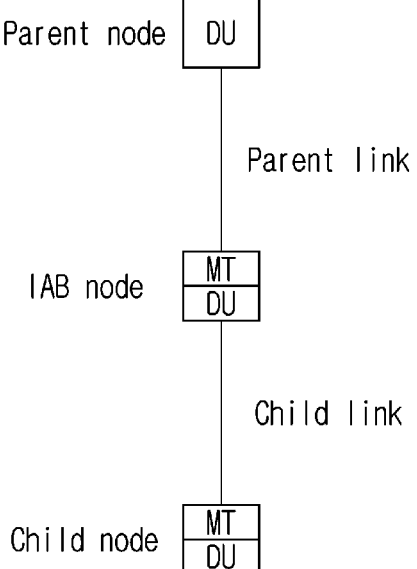

FIG. 15A and FIG. 15B illustrate a connection structure of an IAB node and an IAB donor according to an embodiment of the present disclosure. FIG. 15A illustrates a hierarchical structure of nodes, and FIG. 15B illustrates the concepts of parent node and child node.

Referring to FIG. 15A, a link between a donor node and an IAB node or a link between IAB nodes is referred to as a backhaul link. A link between a donor node and a UE or a link between an IAB node and a UE is referred to as an access link. That is, an access link is a link for connection with a UE, and a backhaul link is a link for connection between nodes (e.g., IAB node, IAB donor, base station) that are not UEs. An IAB node includes a mobile terminal (MT) and a distributed unit (DU), an MT is a component for connecting with an upper node, and a DU is a component for connecting with a lower node. An IAB donor includes a DU and a central unit (CU). A CN is a component for connecting with a core network.

Referring to FIG. 16B, from the perspective of a single IAB node, a lower node connected through a DU is a child node, and connection with the child node is a child link. In addition, an upper node connected through an MT is a parent node, and connection with the parent node is a parent link.

A terminal connected to an IAB node may perform uplink communication and downlink communication through the LAB node. Uplink data transmitted by the terminal is transmitted from the IAB node to an IAB donor via at least one wireless backhaul link and is processed through a CU of the IAB donor. Downlink data towards the terminal is transmitted from the IAB donor to the IAB node via at least one wireless backhaul link and is transmitted to the terminal by a DU of the IAB node.

An IAB node may follow an initial access procedure similar to a UE, including cell search, SI acquisition, and random access, in order to initially set up a connection to a parent IAB node or a IAB donor. The SSB/CSI-RS based RRM measurement is the starting point for IAB discovery and measurement.

Downlink IAB node transmissions (e.g., transmission on a backhaul link from an IAB node to a child IAB node and transmission on an access link from an IAB node to a UE) may be scheduled by the IAB node. Uplink IAB transmission (e.g., transmission on a backhaul link from an IAB node to a parent IAB node or IAB donor) is scheduled by the parent IAB node or IAB donor.

Concrete Embodiment of the Present Disclosure

Hereinafter, the present disclosure describes a technology for delivering a vehicle-to-vehicle (V2V) message that is generated by a vehicle in a wireless communication system. Specifically, the present disclosure proposes a technology for effectively propagating a message generated in a vehicle by using an integrated access and backhaul (IAB) node.

When a 3GPP Rel-16 IAB structure is used, only end-to-end communication between a vehicle or a terminal and an IAB donor is possible. For V2V communication using an IAB node, after a message transmitted from a vehicle or a terminal is delivered to an IAB donor via an IAB node, the message should be delivered to an IAB node in which a vehicle or a terminal to receive the message is located. A time critical message requires a short latency, but it is not easy to reduce the latency in such a structure as described above. In addition, since V2V communication generally uses a sidelink for V2X, a vehicle or terminal not supporting the sidelink has a limitation in receiving a V2V service.

Accordingly, the present disclosure proposes various embodiments for providing a V2V communication service using a 5G NR Rel-16 delay structure. Specifically, the present disclosure describes an enhanced vehicle-to-infrastructure (V2I) technology by which a message (hereinafter 'event message' or 'warning message') notifying an event detected in a vehicle or a terminal is propagated to an adjacent IAB node and each IAB node delivers an event message to a vehicle or a terminal that is in service in the node.

Figure 16:
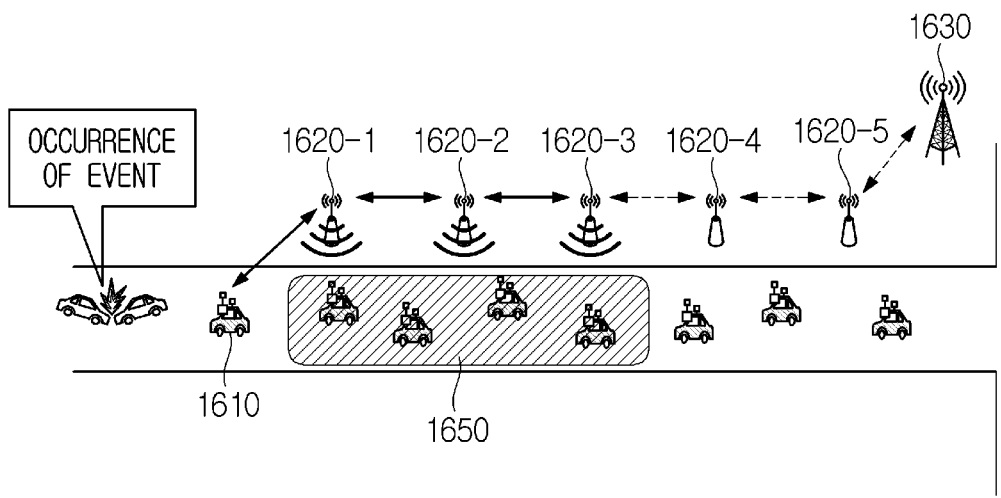
FIG. 16 illustrates a concept of delivering an event message generated by a vehicle in a wireless communication system according to an embodiment of the present disclosure.

FIG. 16 illustrates a concept of delivering an event message generated by a vehicle in a wireless communication system according to an embodiment of the present disclosure. FIG. 16 exemplifies a scenario in which an event message delivering technique is utilized according to various embodiments.

Referring to FIG. 16, a plurality of vehicle terminals, including a vehicle terminal 1610, are running. Herein, the vehicle terminal 1610 detects the occurrence of an event ahead. The event is detected according to a predefined criterion that may include, for example, the occurrence of a car accident ahead, the discovery of a lost item ahead on road, and the starting point of a road maintenance work. To this end, the vehicle terminal 1610 may collect information on a surrounding environment by using a sensor like a camera and detect the occurrence of an event based on the collected information. Alternatively, the vehicle terminal 1610 may detect the occurrence of an event according to an input from an owner or a driver.

The vehicle terminal 1610, which detects the occurrence of an event, generates an event message and transmits the event message to a neighboring IAB node 1620-1. Then, the IAB node 1620-1 broadcasts the event message within a coverage and delivers the event message to an IAB node 1620-2 that is a parent node. Similar operations are repeatedly performed by the IAB node 1620-2 and an IAB node 1620-3. Thus, the event message is delivered to other vehicle terminals within the coverage 1650 of three IAB nodes 1620a to 1620-3.

Delivery of an event message between IAB nodes may stop before it reaches an IAB donor 1630. In the case of FIG. 16, based on a message delivery criterion according to an embodiment, the IAB node 1620-3 does not deliver an event message to a parent node any longer. Accordingly, an IAB node 1620-4 and an IAB node 1620-5 may not broadcast an event message.

Figure 17:
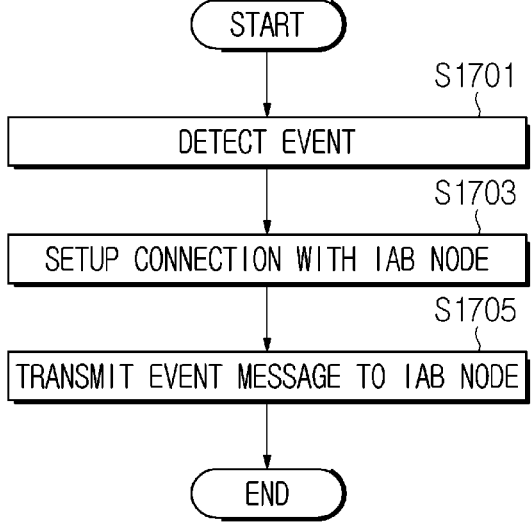
FIG. 17 illustrates an example of an operating method for a terminal that transmits an event message in a wireless communication system according to an embodiment of the present disclosure.

FIG. 17 illustrates an example of an operating method for a terminal that transmits an event message in a wireless communication system according to an embodiment of the present disclosure. FIG. 17 exemplifies an operating method for a terminal (e.g., vehicle terminal 1610) that detects the occurrence of an event.

Referring to FIG. 17, at step S1701, a terminal detects an event. For example, as the event is an item to be shared with other terminals, it may be understood to have urgency of delivery. The event may be detected based on an input of a user of the terminal or sensing data about a surrounding environment. A criterion for detecting the event may be defined differently according to various factors like a region, a time zone, and a type of vehicle.

At step S1703, the terminal sets up a connection to an IAB node. The connection between the terminal and the IAB node may be based on a direct link. Herein the direct link means a link of which the ends are the terminal and the IAB node respectively. That is, the terminal may configure a connection to provide information on the event to a neighboring IAB node. Herein, the IAB node is an IAB node that supports an event message delivery function according to the proposed technique, and the terminal may check, based on system information, whether or not the event message delivery function is supported.

At step S1705, the terminal transmits the event message to the IAB node. The terminal transmits the event message through a configured direct link. The event message may include at least one of identification information of the terminal, an identifier indicating an event type, information on a content of the event, and location information of the terminal.

Figure 18:
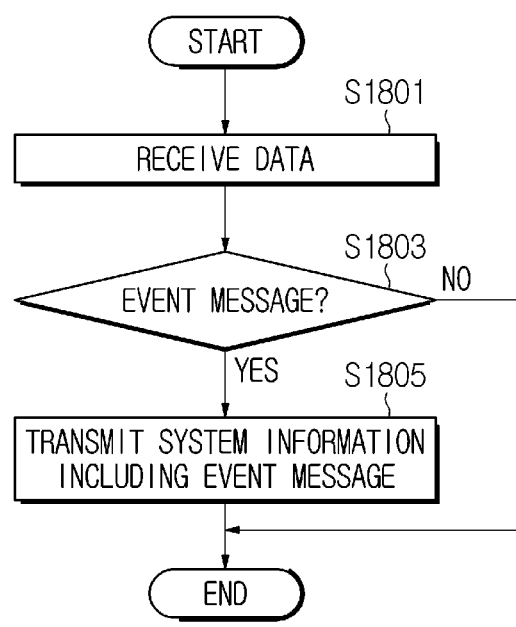
FIG. 18 illustrates an example of an operating method for an integrated access and backhaul (IAB) node that broadcasts an event message in a wireless communication system according to an embodiment of the present disclosure.

FIG. 18 illustrates an example of an operating method for an IAB node that broadcasts an event message in a wireless communication system according to an embodiment of the present disclosure. FIG. 18 exemplifies an operating method for an IAB node (e.g., IAB node 1620-1, IAB node 1620-2, IAB node 1620-3) that broadcasts an event message.

Referring to FIG. 18, at step S1801, an IAB node receives data. Herein, the data may be received from a vehicle terminal or from a child IAB node. When being received from a vehicle terminal, the data is received through a direct link. When being received from a child IAB node, the data is received through a wireless backhaul link.

At step S1803, the IAB node checks whether or not the data includes an event message. The LAB node may determine whether or not an event message is included, based on a type of a link delivering the data or based on information included in a head of the data. For example, when the data is received from a terminal through a direct link, the IAB node determines that the event message is included. As another example, when data received from a child IAB node includes an indicator including a V2V message, the LAB node determines that an event message is included. When the event message is not included in the data, the IAB node may perform a general data relay operation.

On the other hand, when the event message is included in the data, at step S1805, the IAB node transmits system information including the event message. The system information is broadcast so at to be received by every terminal within a coverage. That is, in order to deliver the event message to every terminal within the coverage, the IAB node transmits the event message in a system information block (SIB) form. To this end, the IAB node may transmit a message for notifying a resource for the system information including the event message and transmit the system information including the event message through the resource.

According to an embodiment described with reference to FIG. 17 and FIG. 18, a terminal, which detects an event, configures a connection with an IAB node based on a direct link and transmits an event message. To configure the connection based on the direct link, the terminal may transmit a signal for requesting configuration of a connection to an IAB node. As the direct link is a link defined to delivery an event message according to various embodiments, at least one of a signal for configuring a direct link connection and the event message may be transmitted using a resource that is reserved exclusively for the direct link. Accordingly, collision with direct link communication and other communication (e.g, uplink communication, sidelink communication) may be prevented, and fast event message delivery may be possible. However, according to another embodiment, a sidelink may be used instead of a direct link.

According to an embodiment described with reference to FIG. 17 and FIG. 18, an event message generated in a terminal may be broadcast by an IAB node. Herein, the broadcast of the event message may not stop at an IAB node, which receives the event message from the terminal, but be repeated through an upper IAB node. For example, as described with reference to FIG. 16, an event message may be repeatedly broadcast by three IAB nodes 1620-1, 1620-2 and 1620-3. Herein, the event message may not be propagated to an upper IAB node without restriction but be controlled by a system. An IAB node may selectively perform event message delivery to a parent IAB node based on control information that is received together with the event message. In other words, the control information indicates whether or not an event message is delivered to a parent IAB node, and the IAB node may determine, based on the control information, whether or not the event message is to be delivered to a parent IAB node. Operations of an IAB node, which delivers an event message to a parent IAB node, will be described with reference to FIG. 19 below.

Figure 19:
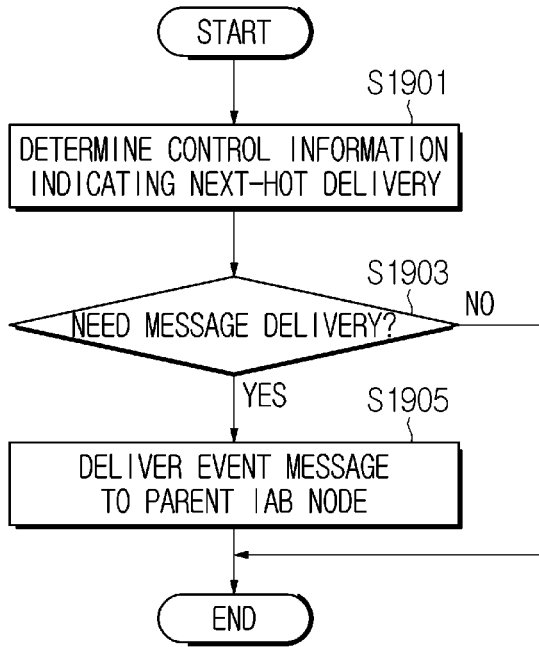
FIG. 19 illustrates an example of an operating method for an IAB node that delivers an event message in a wireless communication system according to an embodiment of the present disclosure.

FIG. 19 illustrates an example of an operating method for an IAB node that delivers an event message in a wireless communication system according to an embodiment of the present disclosure. FIG. 18 exemplifies an operating method for an LAB node (e.g., IAB node 1620-1, IAB node 1620-2) that broadcasts an event message.

Referring to FIG. 19, at step S1901, an IAB node determines control information indicating whether or not to deliver to a next hop. The control information indicating whether or not to deliver to a next hop may be defined in various forms. The control information indicates to what number of hops an event message is to be delivered and broadcast. According to an embodiment, the control information may include a counter that is decreased by broadcasting an event message. An IAB node, which broadcasts an event message, may determine control information by updating a value of a counter (e.g., decreasing by 1). According to another embodiment, the control information may include a combination of a counter, which indicates a cumulative number of broadcasts of an event message, and a threshold indicating the stop of broadcast.

At step S1903, an IAB node determines whether or not delivery of an event message is necessary. In other words, the IAB node determines whether or not to deliver the event message to a parent IAB node, based on the control information (e.g., a value of the counter). When the value of a counter is decreased by 1 and thus becomes 0, the IAB node may determine to stop propagating the event message. On the other hand, when the value of the counter is greater than 0, the LAB node may determine to deliver the event message. In case the delivery of the event message is not determined to be necessary, the IAB node ends this procedure.

On the other hand, in case the delivery of the event message is determined to be necessary, at step S1905, the IAB node delivers the event message to a parent IAB node. Herein, the IAB node also delivers the control information that is updated at step S1901.

As described with reference to FIG. 19, whether or not to deliver an event message may be determined based on control information. Control information is updated as the number of broadcasts of an event message is accumulated. When an event message is delivered from a lower IAB node, an IAB node may obtain control information, which is not updated yet, from the lower LAB node. When an event message is received from a terminal through a direct link, an IAB node may generate control information that is set to an initial value. Herein, the initial value of the control information (e.g., an initial counter value) may be provided from an IAB donor during initial connection to an upper IAB node of the IAB node or the IAB donor, that is, when a backhaul link of the IAB node is configured.

According to various embodiments, a single initial value or a plurality of initial values may be provided from an IAB donor. In case a plurality of initial values is provided, different initial values are applied according to a class of an event message. In this case, the class of an event message may be determined by an IAB node or a terminal and then may be signaled along with the event message. A class may be different according to the urgency and importance of event notification, and an initial value may be selected for delivery across a larger number of hops along with higher importance.

According to the embodiments described above, an event message generated in a vehicle may be propagated through at least one LAB node. An event message delivery technique according to various embodiments may have advantages as follows. By utilizing a wide cell coverage of an IAB node and the high expandability of IAB, it is possible to resolve the restriction on a transmission range of V2V communication using millimeter waves (mmWave). The proposed technique enables message delivery even in case of interruption of V2V communication caused by blockage between wireless communication devices using millimeter waves. When an IAB node is deployed, if a blockage probability likely to occur to the IAB node and vehicle-to-terminal communication is considered, the advantage of resolving such interruption of V2V communication will be further enhanced.

Hereinafter, the present disclosure will describe an architecture of an IAB node and a protocol stack according to various embodiments. In order to support an event message delivery technique according to various embodiments, an IAB node may have an architecture as shown in FIG. 20 below and may be operated according to a protocol stack shown in FIG. 21A to FIG. 21D below.

Figure 20:
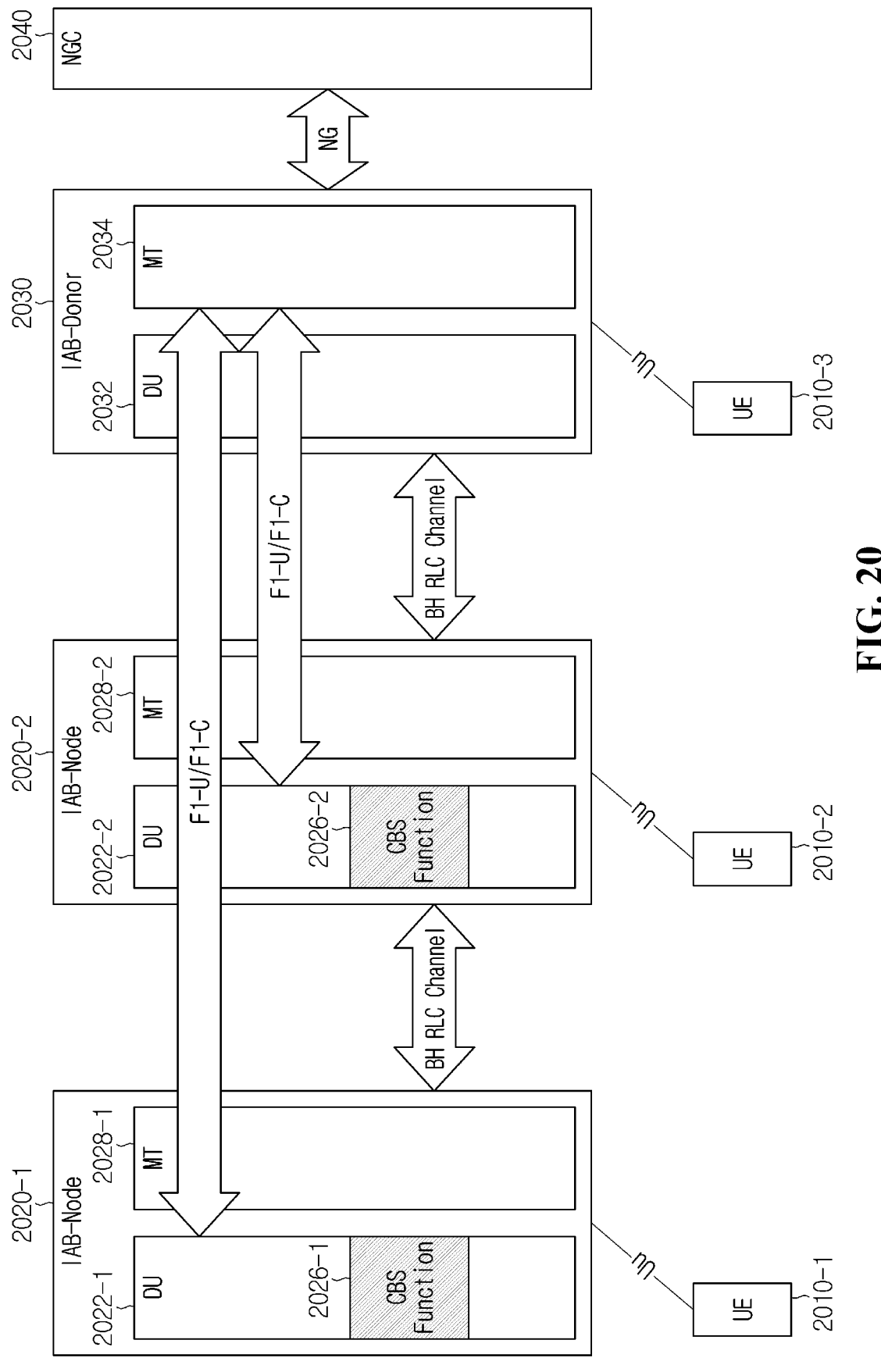
FIG. 20 illustrates a functional architecture of an IAB node in a wireless communication system according to an embodiment of the present disclosure.

FIG. 20 illustrates a functional architecture of an IAB node in a wireless communication system according to an embodiment of the present disclosure. FIG. 20 exemplifies an architecture of a 2-hop IAB node. However, the architecture exemplified in FIG. 20 may be similarly applied to an IAB node with 3 or more hops.

Referring to FIG. 20, a first IAB node 2020-1, a second IAB node 2020-2, an IAB donor 2030, and a next generation core (NGC) are successively connected. The first IAB node 2020-1, the second IAB node 2020-2, and the IAB donor 2030 provide wireless connection to a first terminal 2010-1, a second terminal 2010-2, and a third terminal 2010-3 respectively.

The first IAB node 2020-1 includes a distributed unit (DU) 2022-1 and a mobile terminal (MT) 2028-1. The DU 2022-1 is connected to a CU 1034 of the IAB donor 2030 via an F1-U/F1-C interface, and the first IAB node 2020-1 may transmit and receive data through the second IAB node 2020-2 and a backhaul (BH) RLC channel. Similarly, the second LAB node 2020-2 includes a DU 2022-2 and an MT 2028-2. The DU 2022-2 is connected to the CU 1034 of the IAB donor 2030 via the F1-U/F1-C interface, and the second IAB node 2020-2 may transmit and receive data through the IAB donor 2030 and a backhaul (BH) RLC channel.

According to an embodiment, the DU 2022-1 of the first IAB node 2020-1 includes a cell broadcast service (CBS) function entity 2026-1. Similarly, the DU 2022-2 of the second IAB node 2020-2 includes a CBS function entity 2026-2. The CBS function entities 2026a and 2026-2 generate an event message, trigger paging for system information transmission, and provide functions of delivering an event message through an SIB message.

FIG. 21A to FIG. 21D illustrate a user plane protocol stack between a terminal and an IAB donor that support V2V message delivery using IAB. In other words, FIGS. 21A to 21D exemplify a user plane protocol stack of the terminal 2010, the IAB nodes 20201 and 3020-2, and the IAB donor 2030. For a V2V communication procedure using data local routing like an IAB node, a terminal and an IAB node may be directly connected through a direct layer mm Wave. A direct link may be understood like a sidelink but may have a simpler structure than the sidelink. A terminal may be already synchronized with a serving IAB node through a Uu-link. For direct link transmission, a terminal may use Uu-link timing. There may be a change in some functions of a backhaul adaptation protocol (BAP). When a BAP sublayer adds a BAP header, specific routing information (e.g., a BAP address and a BAP path ID) may be used to indicate that a corresponding message is for a next home broadcast message. Hereinafter, user plane protocol stacks of the terminal 2010, the IAB nodes 2020-1 and 3020-2 and the IAB donor 2030 respectively will be described in further detail.

Figure 21A:
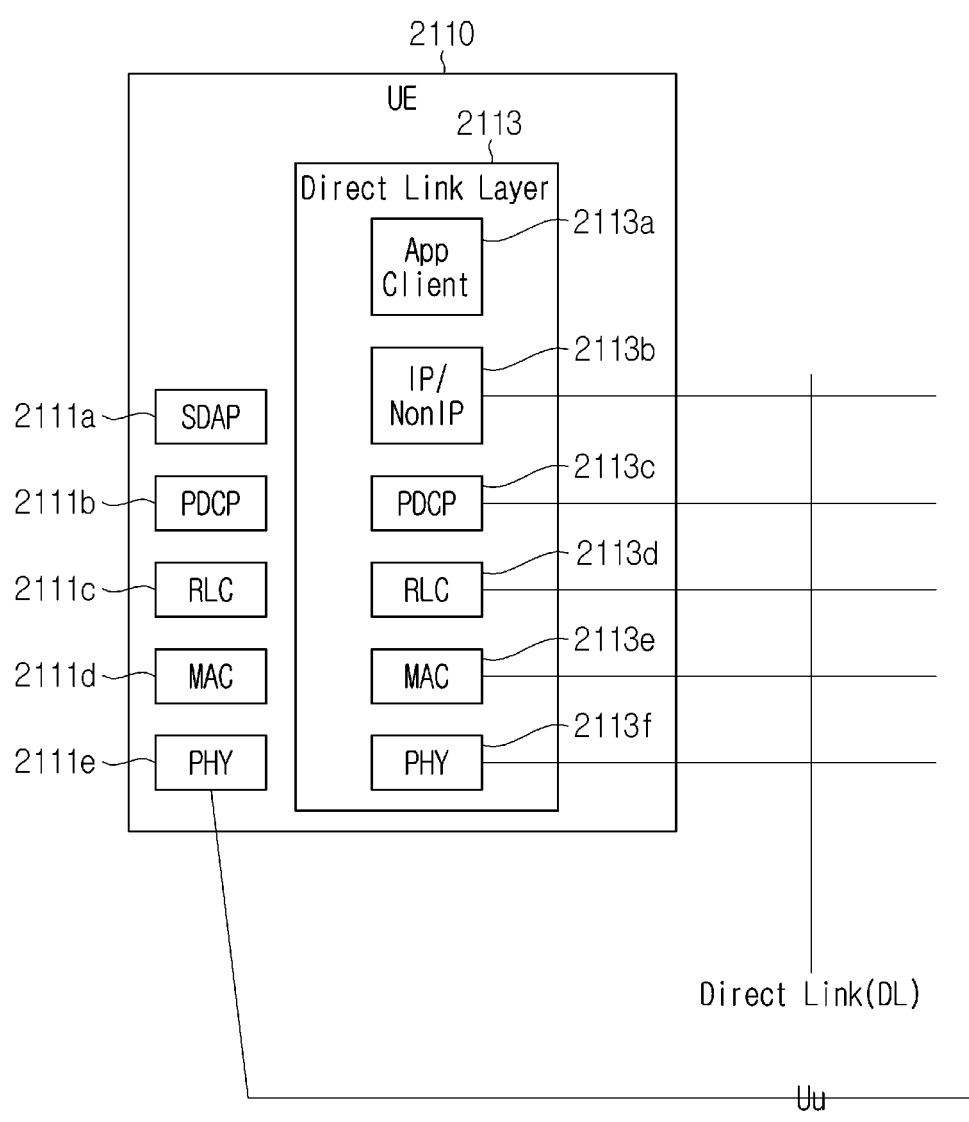
FIG. 21A to FIG. 21D illustrate a user plane protocol stack between a terminal and an IAB donor in a wireless communication system according to an embodiment of the present disclosure.

FIG. 21A illustrates a user plane protocol stack of a terminal supporting V2V message delivery using IAB in a wireless communication system according to an embodiment of the present disclosure. Referring to FIG. 21A, a terminal 2110 includes an SDAP layer 2111a, a PDCP layer 2111b, a RLC layer 2111c, an MAC layer 2111d, a PHY layer 2111e, and a direct link layer 2113. The SDAP layer 2111a, the PDCP layer 2111b, the RLC layer 2111c, the MAC layer 2111d, and the PHY layer 2111e are used for communication through a Uu link. The direct link layer 2113 includes an application client 2113a, an IP/non-IP sublayer 2113b, a PDCP sublayer 2113c, a RLC sublayer 2113d, an MAC sublayer 2113e, and a PHY sublayer 2113f. The application client 2113a has functions like event detection and event message generation and delivers information on an event to the IP/non-IP sublayer 2113b. The IP/non-IP sublayer 2113b generates a packet with a specific address or a specific packet type and delivers information on the packet to the RLC sublayer 2113d.

Figure 21B:
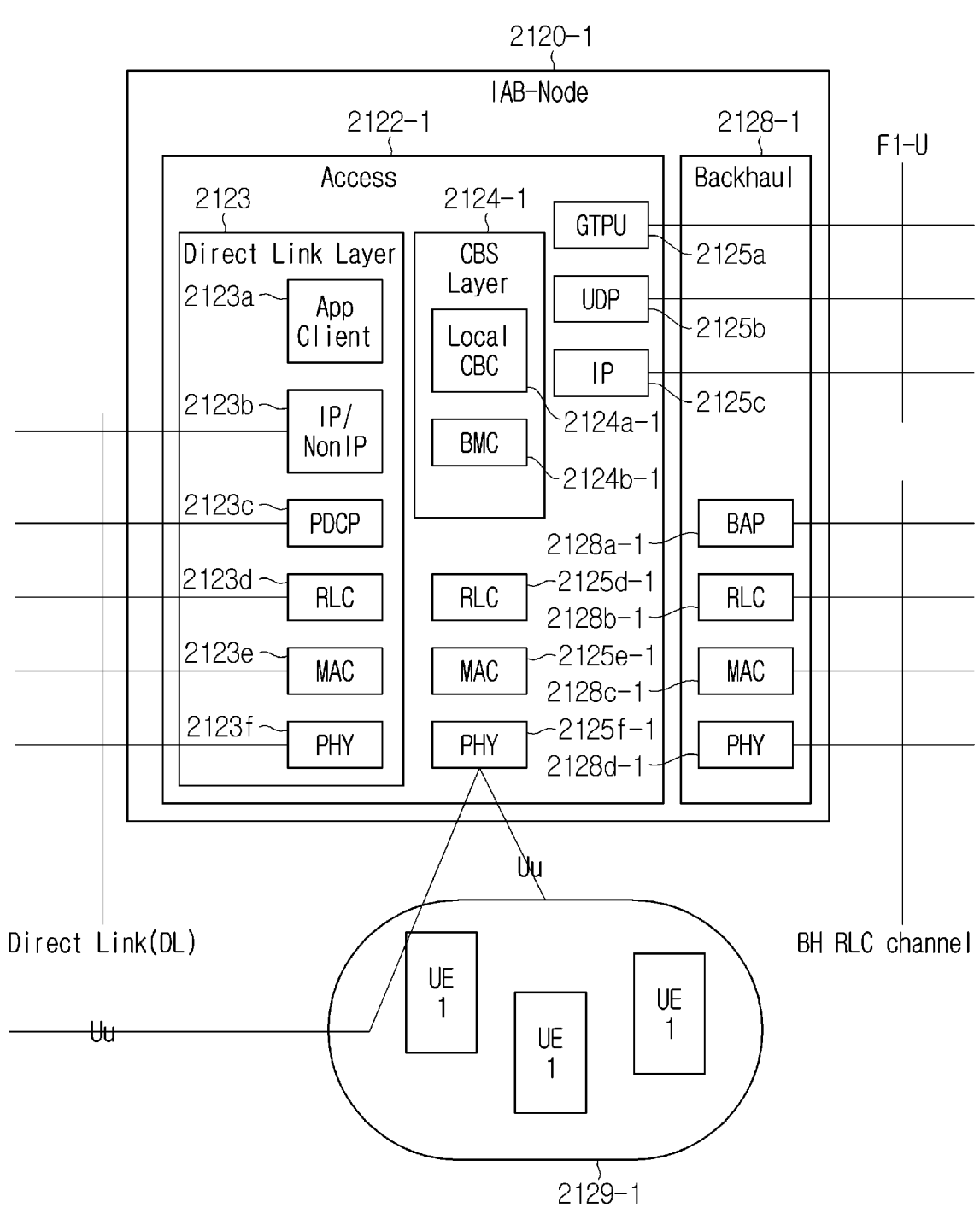

FIG. 21B illustrates a user plane protocol stack of an IAB node supporting V2V message delivery using IAB in a wireless communication system according to an embodiment of the present disclosure. FIG. 21B exemplifies a protocol stack of a first IAB node 2120-1 that forms a direct link with a terminal 2110. Referring to FIG. 21B, the first IAB node 2120-1 includes a protocol stack 2122-1 for an access link and a protocol stack 2128-1 for a backhaul link.

The protocol stack 2122-1 for an access link includes a direct link layer 2123, a CBS layer 2124-1, a general packet radio service tunneling protocol-user plane (GTPU) layer 2125a, a user datagram protocol (UDP) layer 2125b, an IP layer 2125c, a RLC layer 2125d-1, an MAC layer 2125e-1, and a PHY layer 2125f-1. The GTPU layer 2125a, the UDP layer 2125b and the IP layer 2125c form an F1-U link with the IAB donor 2130. The RLC layer 2125d-1, the MAC layer 2125e-1 and the PHY layer 2125f-1 form a Uu link with terminals 2129-1 within coverage and the terminal 2110.

The direct link layer 2123 includes an application server 2123a, an IP/non-IP sublayer 2123b, a PDCP sublayer 2123c, a RLC sublayer 2123d, an MAC sublayer 2123e, and a PHY sublayer 2123f. The IP/non-IP sublayer 2123b, the PDCP sublayer 2123c, the RLC sublayer 2123d, the MAC sublayer 2123e and the PHY sublayer 2123f form a direct link with the IP/non-IP sublayer 2113b, the PDCP sublayer 2113c, the RLC sublayer 2113d, the MAC sublayer 2113e and the PHY sublayer 2113f of the terminal 2110. An IP/non-IP sublayer 2123b-1 processes a packet with a specific address or a specific packet type and delivers information on the packet to a local CBC entity 2124a-1.

A CBS layer 2124-1 includes a local CBC entity 2124a-1 and a BMC entity 2124b-1. The CBS layer 2124-1 provides functions for broadcasting an event message within a coverage. The CBC entity 2124a-1 has functions like triggering of event message transmission through an SIB message, paging message triggering, and event message generation. The BMC entity 2124b-1 has functions of handling/scheduling/transmission of an event message, generation of an SIB message and the like and delivers an SIB message to an access RLC sublayer and/or backhaul RLC layer according to an LAB node configuration. Herein, the SIB message may include a BAP header.

A protocol stack 2128-1 for a backhaul link includes a BAP layer 2128a-1, a RLC layer 2128b-1, an MAC layer 2128c-1, and a PHY layer 2128d-1. The BAP layer 2128a-1 adds specific routing information (e.g., a BAP address, a BAP path ID) to a BAP header according to an IAB node configuration.

Figure 21C:
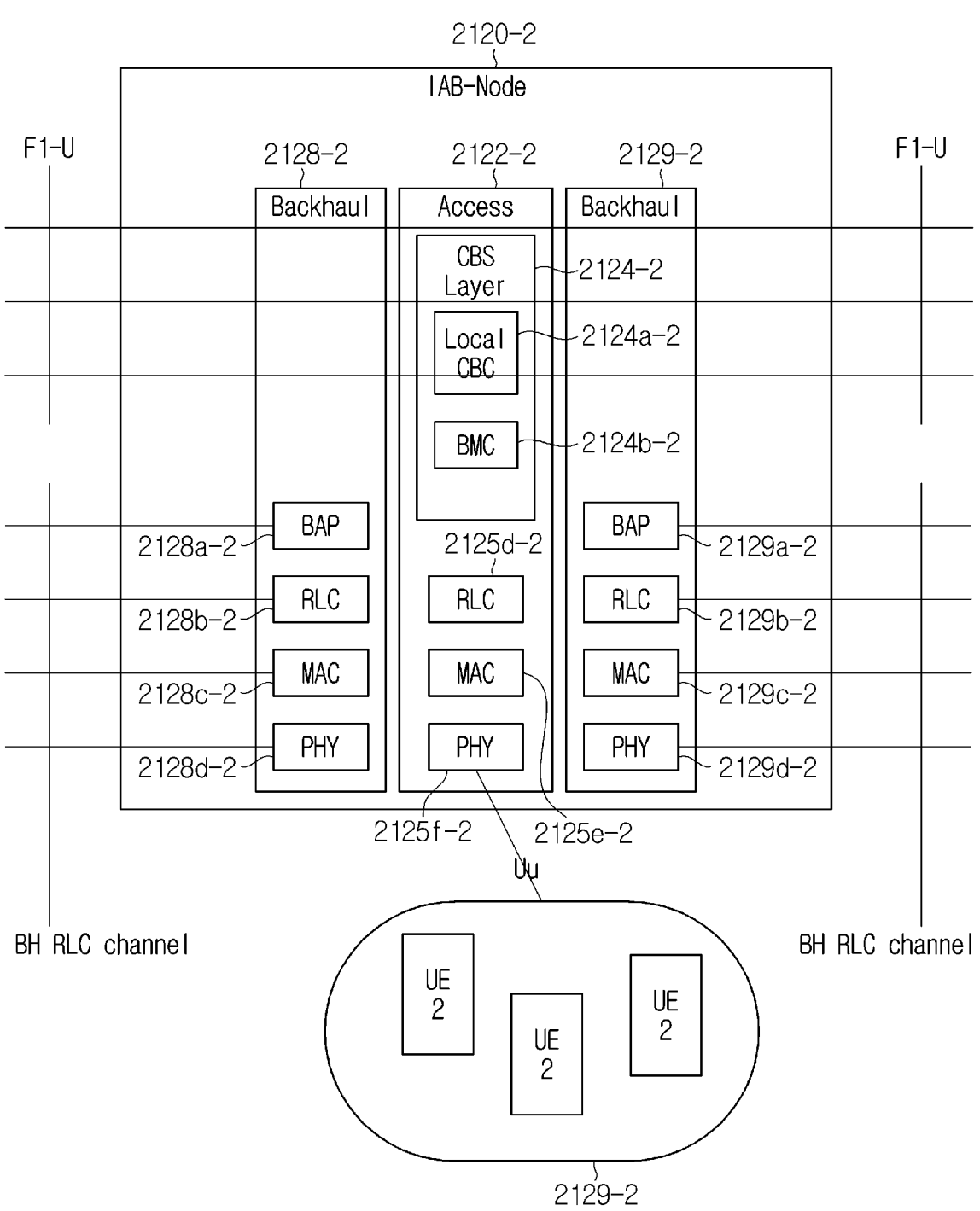

FIG. 21C illustrates a user plane protocol stack of an IAB node supporting V2V message delivery using IAB in a wireless communication system according to an embodiment of the present disclosure. FIG. 21C exemplifies a protocol stack of a second IAB node 2120-2 that receives an event message from the first IAB node 2120-1. Referring to FIG. 21C, the second IAB node 2120-2 includes a protocol stack 2122-2 for an access link, a protocol stack 2128-1 for a first backhaul link towards the first IAB node 2120-1, and a protocol stack 2128-1 for a second backhaul link towards the IAB donor 2130.

The protocol stack 2122-2 for an access link includes a CBS layer 2124-2, a RLC layer 2125d-2, an MAC layer 2125e-2, and a PHY layer 2125f-2. The RLC layer 2125d, the MAC layer 2125e and the PHY layer 2125f form a Uu link with terminals 2129 within coverage and the terminal 2110. A CBS layer 2124-2 includes a local CBC entity 2124a-2 and a BMC entity 2124b-2. The CBS layer 2124-2 provides functions for broadcasting an event message to terminals 2129-2 within a coverage. The CBC entity 2124a-2 has functions like triggering of event message transmission through an SIB message, paging message triggering, and event message generation. The BMC entity 2124b-2 has functions of handling/scheduling/transmission of an event message, generation of an SIB message and the like and delivers an SIB message to an access RLC sublayer and/or backhaul RLC layer according to an IAB node configuration. Herein, the SIB message may include a BAP header.

The protocol stack 2128-1 for a first backhaul link includes a BAP layer 2128a-2, a RLC layer 2128b-2, an MAC layer 2128c-2, and a PHY layer 2128d-2. The BAP layer 2128a-2, the RLC layer 2128b-2, the MAC layer 2128c-2, and the PHY layer 2128d-2 are connected with the BAP layer 2128a-1, the RLC layer 2128b-1, the MAC layer 2128c-1, and the PHY layer 2128d-1 of the first IAB node 2120-1 through a BH RLC channel. The BAP layer 2128a-2 checks whether or not a BAP header of BAP PDU received from the first IAB node 2120-1 includes specific routing information (e.g., a BAP address and a BAP path ID) and delivers the BAP PDU to the local CBC entity 2124a-2.

The protocol stack 2128-1 for a second backhaul link includes a BAP layer 2129a-2, a RLC layer 2129b-2, an MAC layer 2129c-2, and a PHY layer 2129d-2. The BAP layer 2129a-2 adds specific routing information (e.g., a BAP address, a BAP path ID) to a BAP header according to an IAB node configuration.

Figure 21D:
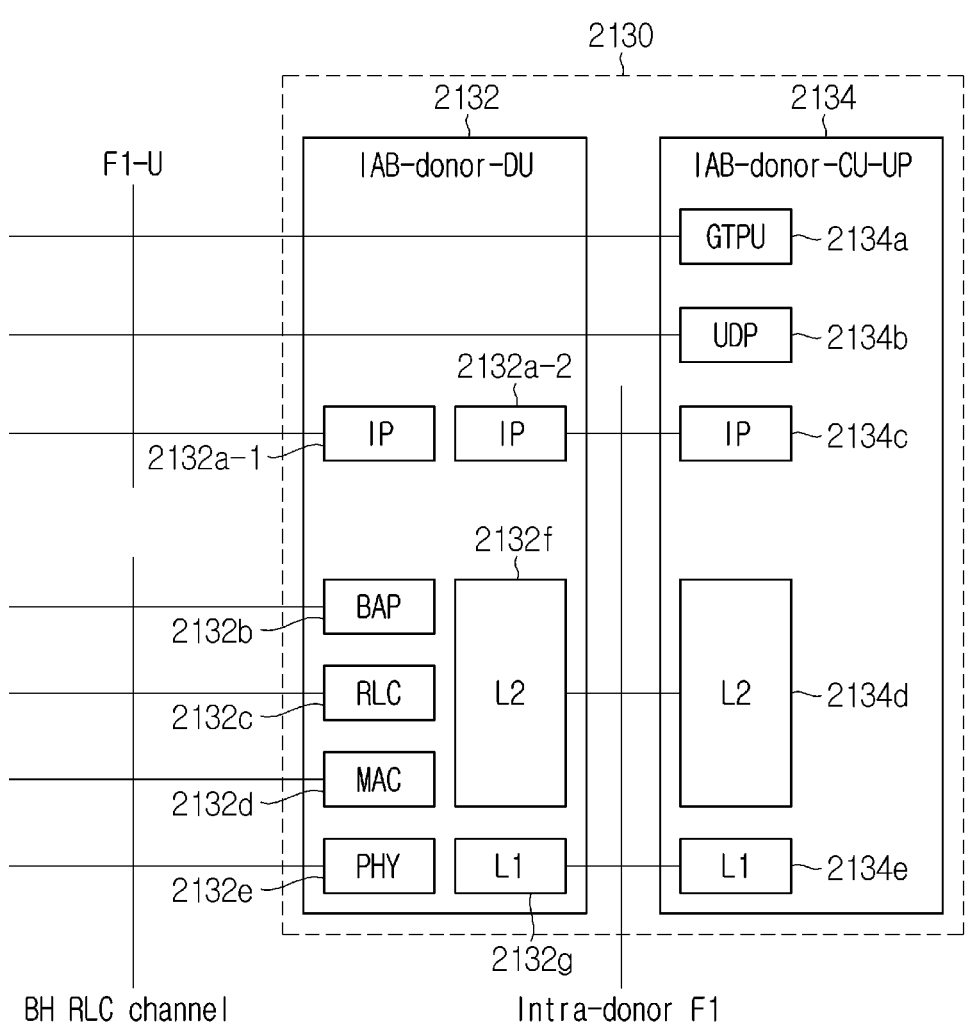

FIG. 21D illustrates a user plane protocol stack of an IAB donor supporting V2V message delivery using IAB in a wireless communication system according to an embodiment of the present disclosure. Referring to FIG. 21D, the LAB donor 2130 includes a DU 2132 and a central unit (CU)-user plane (UP) 2134. As a protocol stack for connection with the second IAB node 2120-2, the DU 2132 includes an IP layer 2132a-1, a BAP layer 2132b, a RLC layer 2132c, an MAC layer 2132d, and a PHY layer 2132e, and as a protocol stack for connection with the CU-UP 2134, it includes an IP layer 2132a-2, a L2 layer 2132f, and a L1 layer 2132g. The CU-UP 2134 includes a GUPU layer 2134a, a UDP layer 2134b, an IP layer 2134c, a L2 layer 2134d, and a L1 layer 2134e.

The BAP layer 2132b, the RLC layer 2132c, the MAC layer 2132d, and the PHY layer 2132e of the DU 2132 are connected with the BAP layer 2129a-2, the RLC layer 2129b-2, the MAC layer 2129c-2, and the PHY layer 2129d-2 of the second IAB node 2120-2 through a BH RLC channel. The GUPU layer 2134a, the UDP layer 2134b and the IP layer 2132a-1 form an F1-U link with the GTPU layer 2125a, UDP layer 2125b and IP layer 2125c of the first IAB node 2120-1. The L2 layer 2132f and L1 layer 2132g of the DU 2132 form an intra-donor F1 link with the L2 layer 2134d and L1 layer 2134e of the CU-UP 2134.

An event message delivery procedure according to various embodiments will be described as follows with reference to a protocol stack described with reference to FIG. 21A to FIG. 21D.

A V2V service starts to deliver an alert or warning message for an event from an application client 2113a of a terminal 2110, which detects the event, to a neighboring terminal. In order to transmit a waring message, a directlink layer 2113 of the terminal 2110 configures a directlink radio bearer by performing a directlink establishment procedure with the first IAB node 2120-1 that is an IAB node-type enhanced V2I device.

When receiving the warning message, the first IAB node 2120-1 delivers the warning message to a local CBC sublayer 2124a-1 of a CBS layer 2124-1. The local CBC sublayer 2124a-1 has functions of triggering of cell broadcast message transmission, triggering of paging message transmission, and warning message generation. An alert message or a warning message generated by the local CBC sublayer 2124a-1 is delivered to a BMC sublayer 2124b-1. The BMC sublayer 2124b-1 has functions of storing and delivering a cell broadcast message to a lower layer, traffic volume monitoring and radio resource management, SIB message generation using a cell broadcast message, SIB message scheduling, SIB message transmission to terminal within coverage, determination of next hop broadcast message delivery for a cell broadcast message according to upper layer configuration (e.g., configuring by the CU 2134 of the IAB donor 2130), and hop counter handling for delivery of a cell broadcast message. Accordingly, the BMC sublayer 2124b-1 transmits an alert or warning message with SIB type for V2V to one or more terminals 2129-1 that are served by the first IAB node 2120-1.

Another main function of the BMC sublayer 2124b-1 is the next-hop broadcast message delivery. In an initial IAB integration process, whether or not to deliver a next-hop broadcast message may be determined according to a BMC configuration (e.g., an initial hop counter (INIT HOP COUNTER), an IAB routing ID) that is obtained from the CU 2134 of the IAB donor 2130 through an F1-C signaling message. In case a flag associated with a next-hop broadcast is enabled, the BMC sublayer 2124b-1 delivers a broadcast message to the MT-side BAP sublayer 2128a-1 in order to deliver a message to the second IAB node 2120-2 that is a next-hop IAB node. Herein, a header of BMC PDU includes hop counter information that is used. In addition, a header of BAP PDU includes information indicating that the message is a V2V message. The message is transmitted to the second IAB node 2120-2, which is a parent IAB node, through an upstream BH RLC channel. In case a flag associated with a next-hop broadcast is disabled, next-hop broadcast message delivery is not performed.

Figure 22:
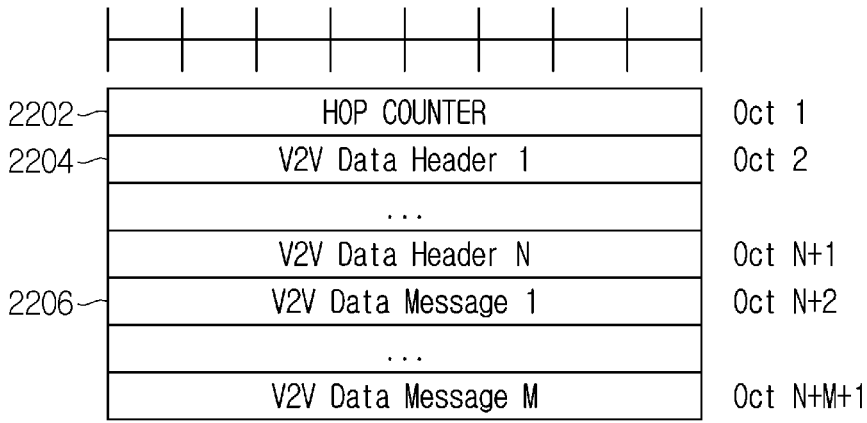
FIG. 22 illustrates an example of a broadcast message control (BMC) protocol data unit (PDU) including information associated with delivering an event message in a wireless communication system according to an embodiment of the present disclosure.

According to an embodiment, a flag associated with a next-hot broadcast may include a hop counter. For example, as shown in FIG. 22, a hop counter may be included in a form of BMC PDU header located at top of BMC PDU including an SIB message for V2V. FIG. 22 illustrates an example of a BAP PDU including information associated with delivering an event message in a wireless communication system according to an embodiment of the present disclosure. Referring to FIG. 22, BMC PDU may include a hop counter 2202, a plurality of headers including a V2V data header 1 2204, and a plurality of messages including a V2V data message 1 2206. A hop counter is delivered to a lower layer. In the case of upstream, a lower layer is a BAP sublayer 2128*a*-1 within an MT of a first IAB node 2120-1. A hop counter is initially configured as INIT HOP COUNTER by the CU 2134 of the IAB donor 2130, is updated as necessary, and is used when the first IAB node 2120-1 transmits a cell broadcast message received from an upper layer.

For example, when an IAB node (e.g., second IAB node 2120-2) receives a cell broadcast message from a child IAB node (e.g., first IAB node 2120-1), a BAP PDU header test is performed. When the BAP PDU header test confirms that the cell broadcast message is for V2V message, the cell broadcast message is delivered to an upper layer, for example, a CBS layer. The BMC sublayer decreases a hop counter by 1. When the hop counter is 0, an IAB node does not deliver the cell broadcast message to a parent IAB node. When the hop counter is 0, it means that the flag is disabled. When the hop counter is not 0, it means that the flag is enabled.

Figure 23:
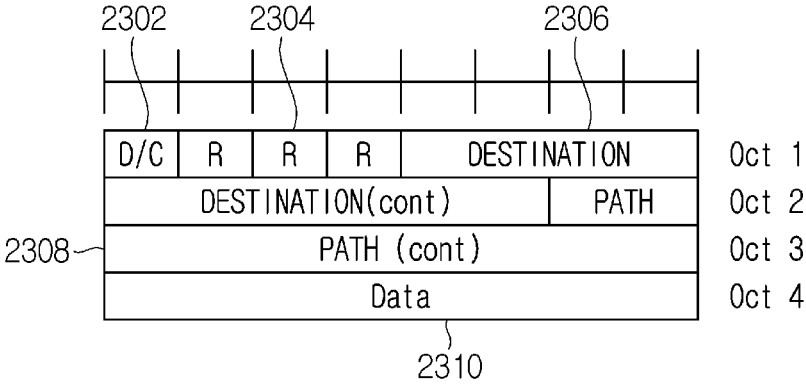
FIG. 23 illustrates an example of a backhaul adaptation protocol (BAP) PDU including information associated with delivering an event message in a wireless communication system according to an embodiment of the present disclosure.
Figure 24A:
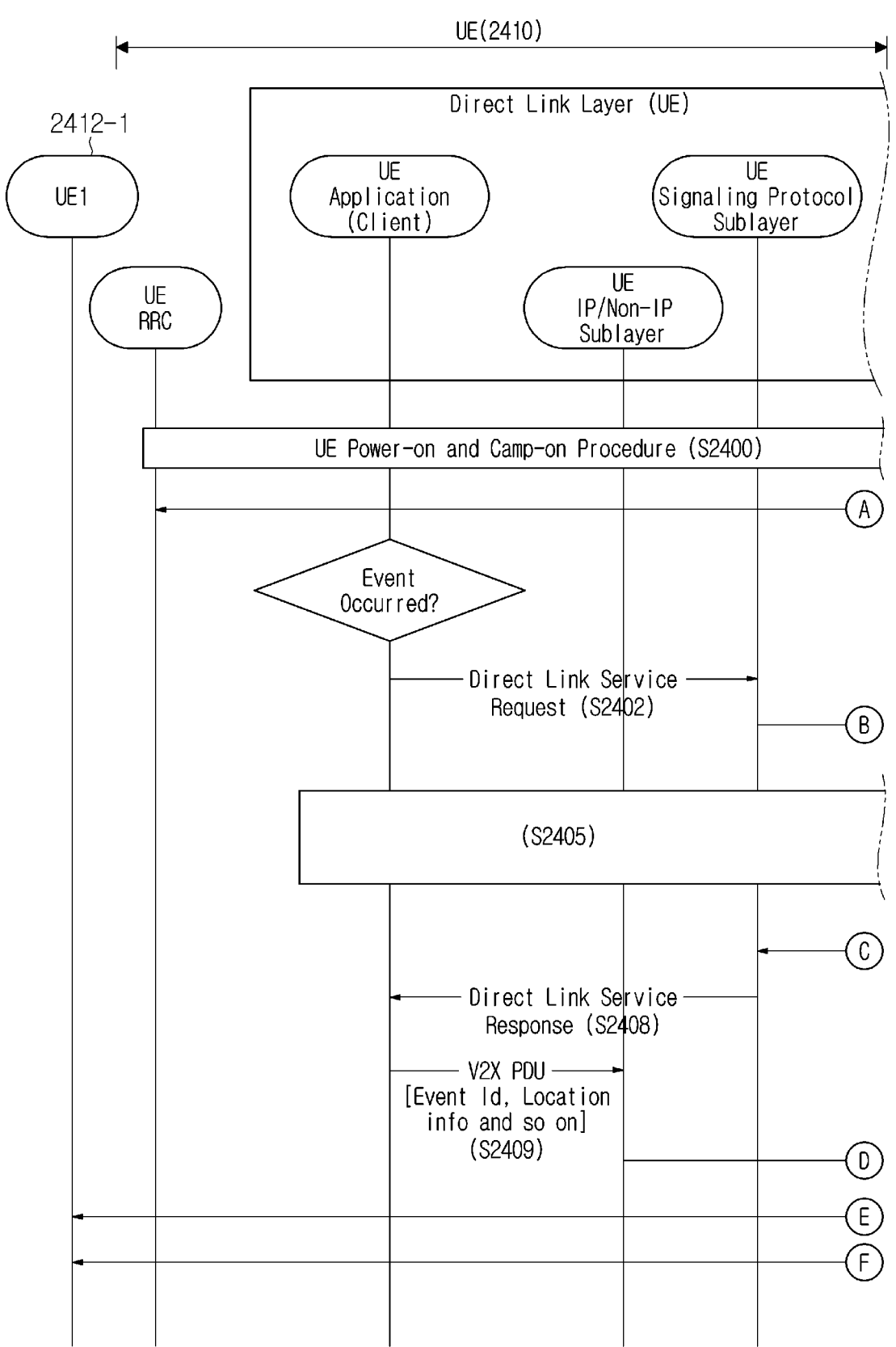
FIG. 24A to FIG. 24G illustrate an example of a procedure of delivering an event message in a wireless communication system according to an embodiment of the present disclosure.
Figure 24B:
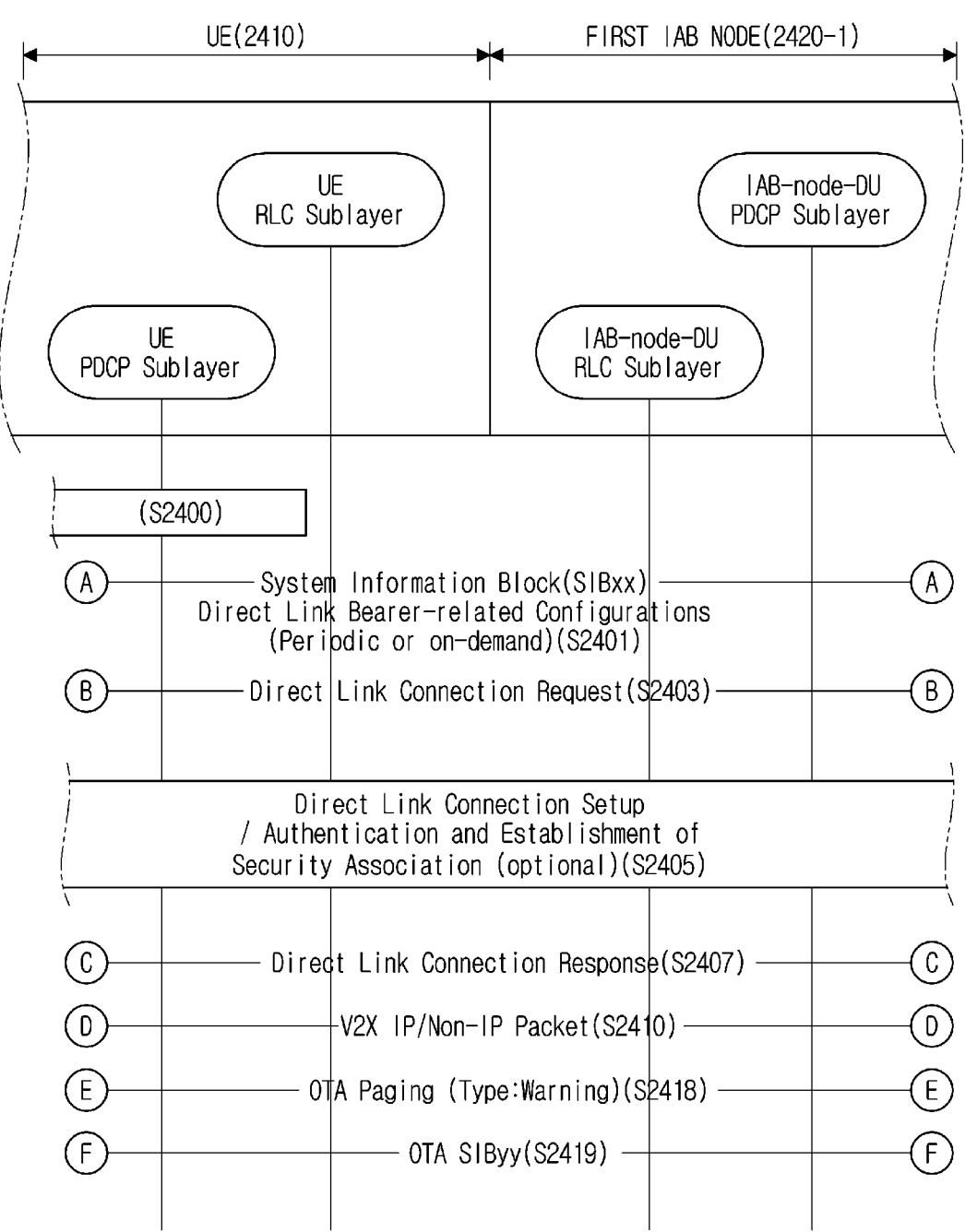
Figure 24C:
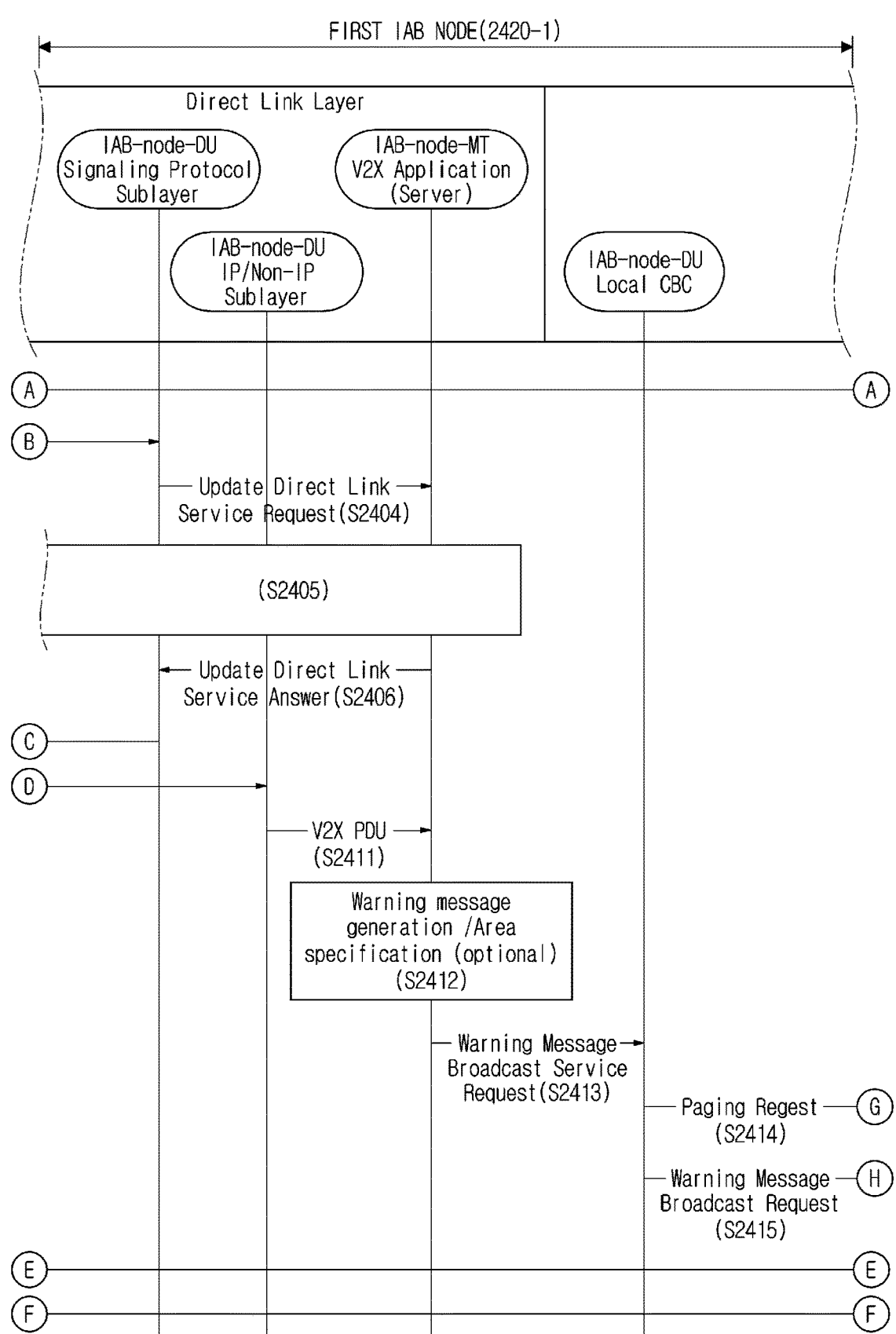
Figure 24D:
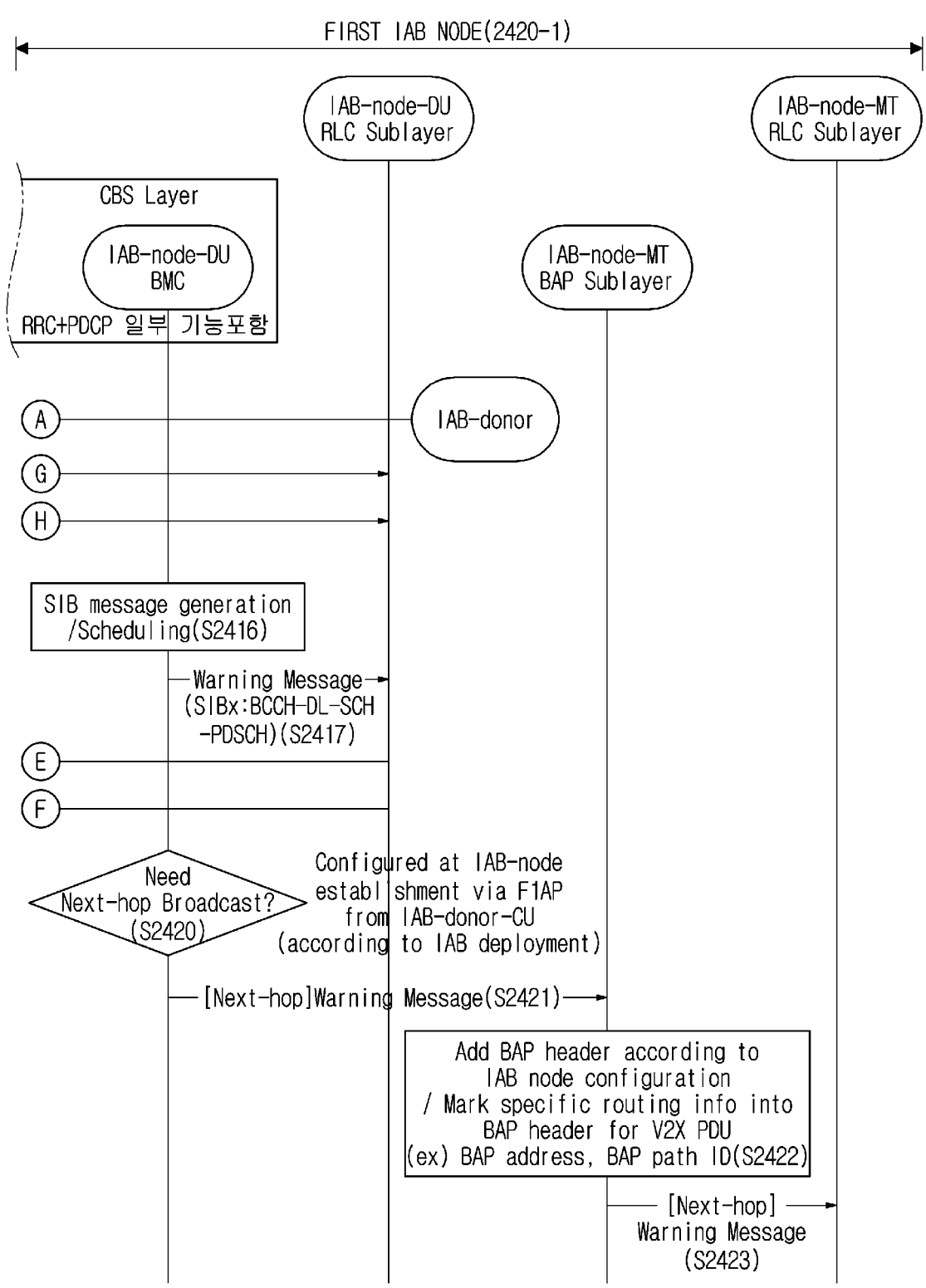
Figure 24E:
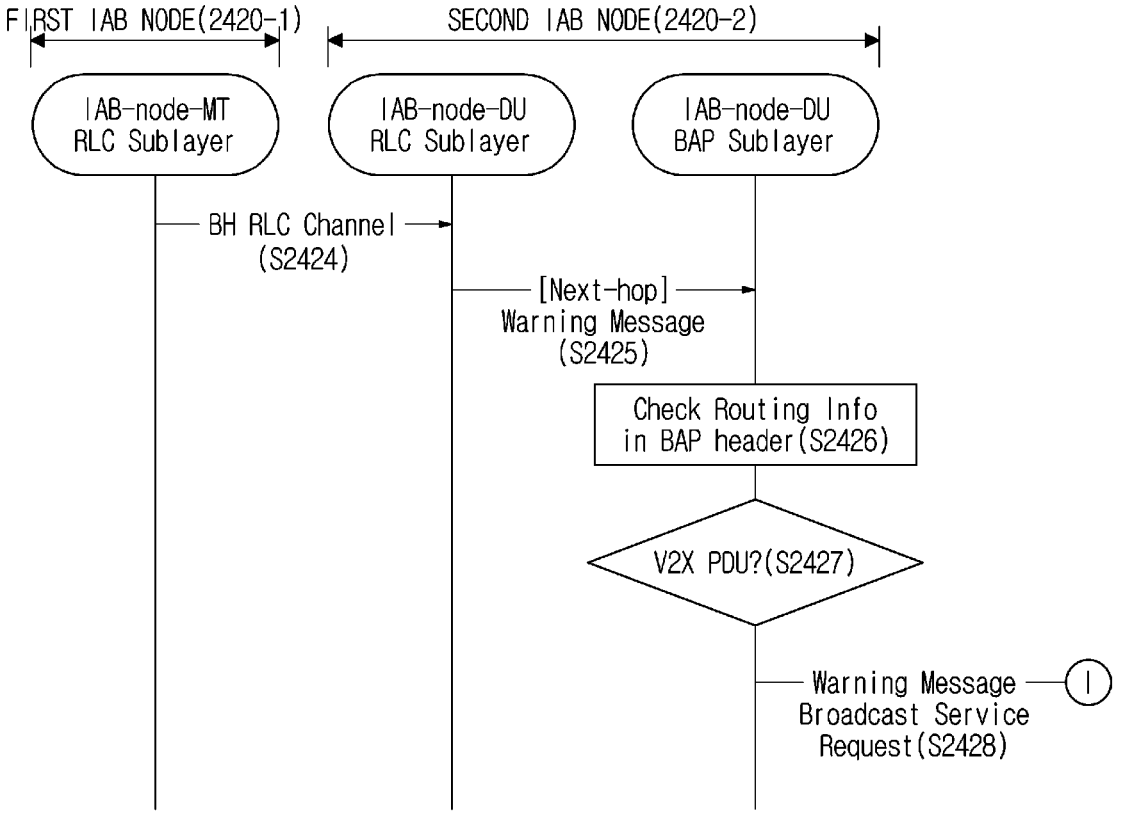
Figure 24F:
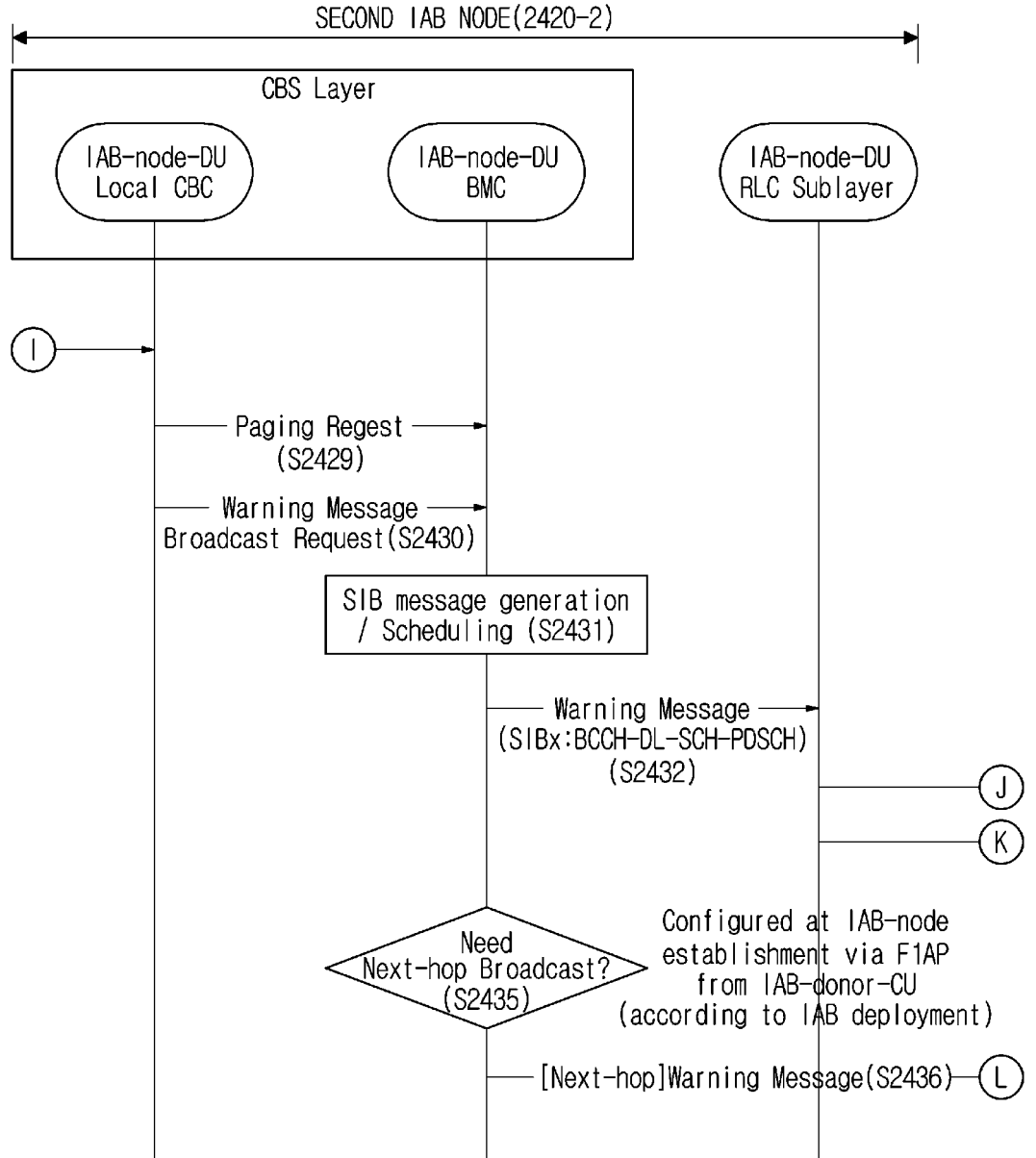
Figure 24G:
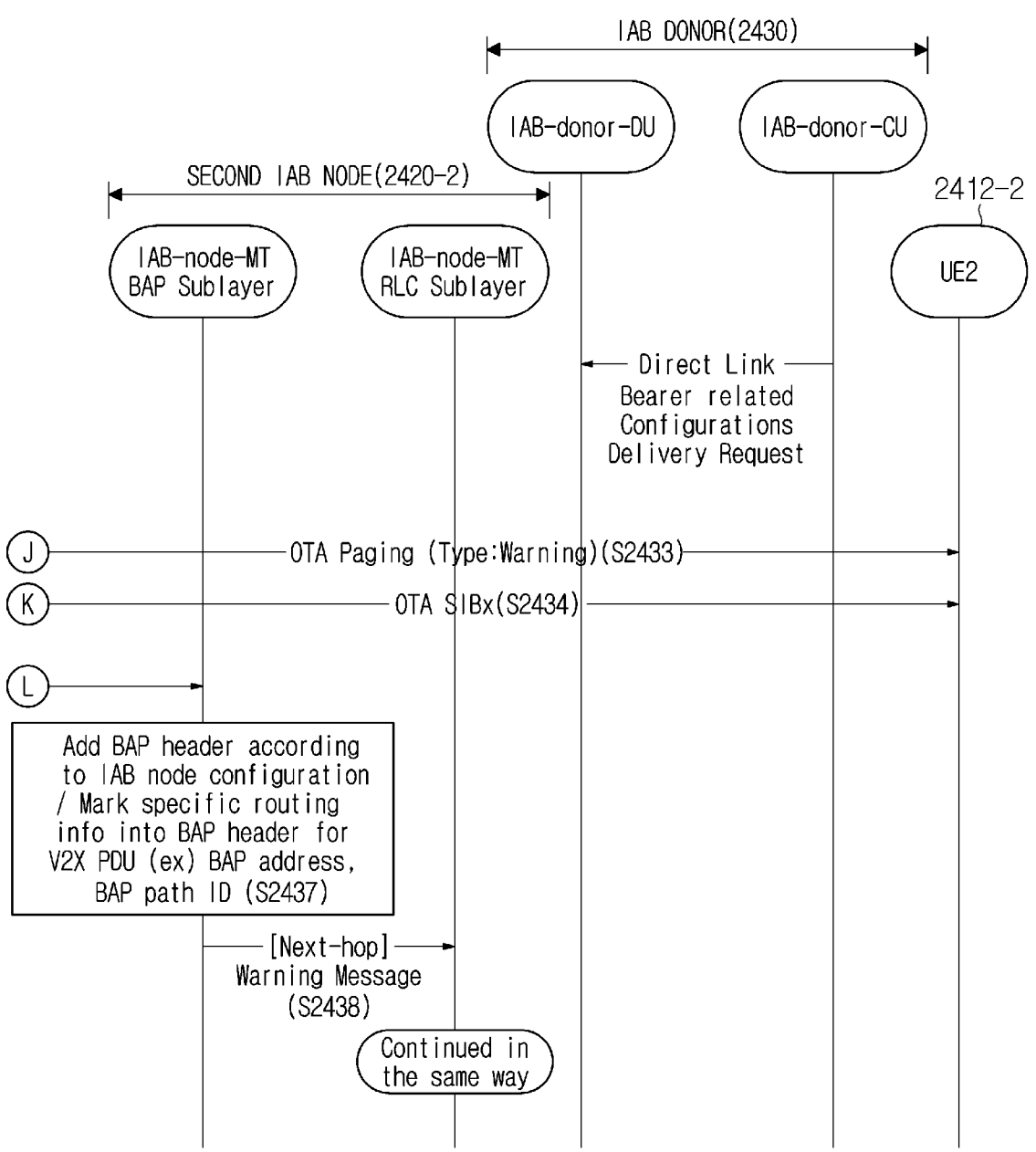

According to an embodiment, various fields within a BAP PDU header may be used to express that a V2V message is included in a BAP PDU. The BAP PDU header may be configured as shown in FIG. 23. Referring to FIG. 23, the BAP PDU header includes a 1-bit data/control (D/C) filed 2302, 3-bit reserved bits 2304, a 10-bit destination field 2306, a 10-bit path ID field 2308, and a data field 2310. For example, by using a value of the reserved bits 2304, whether or not a V2V message is included in the data field 2310 may be expressed. In case a V2V message is included, all the reserved bits 2304 may be set to 1. On the other hand, in case no V2V message is not included, all the reserved bits 2304 may be set to 0. As another example, by using specific routing information, whether or not a V2V message is included in the data field 2310 may be expressed. Routing information is expressed by at least one of the destination field 2306 and the path ID 2308. Routing information set to a specific value may be interpreted to mean that the data field 2310 includes a V2V message, that is, a next-hop broadcast message.

A V2V message, which is delivered from the first IAB node 2120-1 that is a child IAB node and also an IAB node type enhanced V2I device, is delivered to a DU-side BAP sublayer 2124*b*-1. The BAP sublayer 2124*b*-1 confirms a BAP PDU header, and in case of general traffic, delivers data to a next parent IAB node or the LAB donor 2130. On the other hand, when data in a BAP PDU is a V2V message, the second IAB node 2120-2 broadcasts a V2V message, as described above.

Then, operations of propagating a cell broadcast message are repeated based on the above-described hop counter information. In a case like the example of FIG. 16, three IAB nodes 1620-1, 1620-2 and 1620-3 broadcast a V2V message, and a flag is disabled at the third IAB node 1620-3. Accordingly, at the third IAB node 1620-3, the V2V message is not further delivered to an MT-side BAP sublayer, and the message propagation ends.

FIG. 24A to FIG. 24G illustrate an example of a procedure of delivering an event message in a wireless communication system according to an embodiment of the present disclosure. FIGS. 24A to 24G exemplify a signal exchange for a procedure in which a message about an event detected by a UE 2410 connected to a first IAB node 2420-1 is broadcast by the first IAB node 2420-1 and a second IAB node 2420-2. In the examples of FIG. 24A to FIG. 24G, the first IAB node 2420-1 has a 2-hop connection with an IAB donor, and the second IAB node 2420-2 has a one-hop connection with the IAB donor. Based on the number of hops, the first IAB node 2420-1 may be referred to as 'IAB node 2', and the second IAB node 2420-2 may be referred to as 'IAB node 1'.

Referring to FIG. 24A to FIG. 24G, at step S2400, the UE 2410 is switched on and camps on to the first IAB node according to a general cell selection procedure.

At step S2401, the UE 2410 receives SIBxx from the first IAB node. SIBxx includes information associated with the first IAB node and is generated by the LAB donor 2430. A UE may know whether or not a serving cell has a capability of directlink communication. SIBxx includes configuration parameters of a directlink connection like a directlink communication transmission resource. In order to avoid mutual interference between transmission UEs. a serving cell may include multiple directlink communication resources. The UE randomly selects a resource out of multiple resources and uses the selected resource.

At step S2402, when an event occurs, an application (e.g., an application client) of the UE 2410 triggers direct link establishment and delivers a direct link service request message to a signaling protocol (e.g. RRC protocol) sublayer.

At step S2403, when the signaling protocol sublayer receives the direct link service request message, the signaling protocol sublayer delivers the message to a peer part of a first IAB node to which the UE 2410 camps on.

At step S2404, the signaling protocol of the first IAB node delivers an update direct link service request message to an application server sublayer. The UE 2410 may initiate a direct link connection configuration procedure, irrespective of a RRC state. However, it should be ensured that the UE 2410 is within a cell coverage. Under this condition, downlink timing of the UE 2410 is almost aligned in a serving cell, and thus the serving cell may detect a transmission signal of UE in a direct link without a synchronization procedure (minimum system impact and minimum change of implementation).

At step S2405, when step S2404 is successfully completed, a direct link connection is configured. When necessary, an authentication and security procedure may be performed.

At step S2406, when the direct link connection configuration is completed, an application server sublayer of the first IAB node 2420-1 delivers an update direct link service answer message to a signaling protocol sublayer.

At step S2407, when the signaling protocol sublayer of the first IAB node 2420-1 receives the update direct link service answer message, the signaling protocol sublayer delivers a direct link connection response message to a signaling protocol sublayer of the UE 2410.

At step S2408, after step S2407, the signaling protocol sublayer of the UE 2410 delivers the direct link service response message to an application (e.g., application client) of the UE 2410.

At steps S2409 to S2411, after the direct link connection is configured, the application (e.g., application client) of the UE 2410 transmits a V2X PDU to a peer entity (e.g., application server) of the first IAB node 2420-1. The V2X PDU includes event-related information such as an event type, an event ID, a priority order, location information and time.

At step S2412 and at step S2413, when the application server of the first IAB node 2420-1 receives the V2X PDU, the application server attempts to compile a warning message and transmits the compiled warning message to a local CBC sublayer by using a warning message broadcast service request message.

At step S2414 and step S2415, when the local CBC sublayer of the first IAB node 2420-1 receives the warning message broadcast service request message, the local CBC sublayer of the first IAB node 2420-1 requests paging with a type of the warning broadcast request message to the BMC sublayer.

At step S2416, the BMC sublayer of the first IAB node 2420-1 generates a system information message (e.g., SIByy) and schedules the transmission of the SIByy.

At step S2417, the BMC sublayer of the first IAB node 2420-1 provides the generated system information message (e.g., SIByy) to a lower layer according to scheduling information.

At step S2418 and step S2419, the first IAB node 2410-1 transmits an OTA SIByy message in accordance with paging request message indicating OTA (over the air) SIByy message transmission. Accordingly, the UE 1 2412-1, which exists within the coverage of the first IAB node 2420-1, may receive the SIByy message.

At step S2420, the BMC sublayer of the first IAB node 2420-1 plays an information role to transfer a warning message to a next hop. It is configured whether or not the warning message to broadcast needs to be delivered during the procedure of IAB node establishment and routing table update by the CU of the IAB-donor 2430. If a next-hop broadcast flag is enabled, the first IAB node 2420-1 attempts to deliver the warning message to a parent IAB node. Otherwise, this procedure ends.

At step S2421, when a next-hop broadcast flag is enabled, the BMC sublayer of the first IAB node 2420-1 delivers a [next-hop] warning message to the BAP sublayer.

At step S2422, when the BAP sublayer of the first IAB node 2420-1 adds a BAP header to the message delivered from the upper layer, the BAP sublayer uses specific information to indicate that the contained data includes a warning message to be broadcast. A BAP Data PDU format includes a 10-bit destination address and a 10-bit path address in the BAP header. In BAP header, 3-bit reserved bits may be used for the above-described purpose (e.g., adding the specific information).

The BAP sublayer performs mapping to a BAP address and BAP path ID, which are contained in uplink backhaul information configured on the IAB-node. Each entry of the uplink backhaul information contains [trafficTypeSpecifier], [BAP-address] and [pathID].

At steps S2423 to S2425, the BAP sublayer of the first IAB node 2420-1 delivers a [next-hop] warning message to a RLC sublayer, and the [next-hop] warning message is delivered to a peer BAP sublayer of the second IAB node 2420-2 that is a parent IAB node.

At steps S2426 to S2428, the BAP sublayer of the second IAB node 2420-2 checks the BAP header. If the header contains specific information indicating that the data includes a warning message for broadcast, the BAP sublayer delivers a warning message broadcast service request message to a local CBC sublayer. Otherwise, the data is processed as normal data.

At step S2429 and step S2430, when the local CBC sublayer of the second IAB node 2420-2 receives the warning message broadcast service request message, the local CBC sublayer requests paging with a type of the warning broadcast request message to the BMC sublayer.

At step S2431, after step S2430, the BMC sublayer of the second IAB node 2420-2 generates a system information message (e.g., SIByy) and schedules the transmission of the system information message.

At step S2432, the BMC sublayer of the second IAB node 2420-2 delvers the generated system information message (e.g., SIByy) to a lower layer according to scheduling information for the system information message.

At step S2433 and step S2434, the second IAB node 2420-2 transmits an OTA SIByy message in accordance with paging request message indicating OTA SIByy message transmission. Accordingly, the UE 2 2412-2, which exists within the coverage of the second IAB node 2420-2, may receive the SIByy message.

At step S2435, the BMC sublayer of the second IAB node 2420-2 is configured according to whether or not the warning message to broadcast needs to be delivered during the procedure of IAB node establishment and routing table update by the CU of the IAB-donor 2430. If a next-hop broadcast flag is enabled, the IAB node attempts to deliver the warning message to a parent IAB node. Otherwise, this procedure ends.

At step S2436, when a next-hop broadcast flag is enabled, the BMC sublayer of the second IAB node 2420-2 delivers a [next-hop] warning message to the BAP sublayer.

At step S2437, when the BAP sublayer of the second IAB node 2420-2 adds a BAP header to the message delivered from the upper layer, the BAP sublayer uses specific information to indicate that the contained data includes a warning message to be broadcast. In BAP header, 3-bit reserved bits may be used for the above-described purpose (e.g., adding the specific information).

The BAP sublayer performs mapping to a BAP address and BAP path ID, which are contained in uplink backhaul information configured on the IAB-node. Each entry of the uplink backhaul information contains [trafficTypeSpecifier], [BAP-address] and [pathID].

At step S2438, the BAP sublayer of the second IAB node 2420-2 delivers a [next-hop] warning message to a RLC sublayer, and the [next-hop] warning message is delivered to a peer BAP sublayer of a parent IAB node (not illustrated). The procedure continues in this way.

As described above, according to various embodiments, through a local traffic handling process for a message transmitted from a vehicle or a terminal, one or more adjacent IAB nodes broadcast the message to terminals connected to the nodes. By delivering a V2V message using an IAB node, signal disconnection due to blockage, which may occur between transmitting and receiving devices, may be reduced.

In addition, in terms of price or architecture, an IAB node has better expandability than an existing gNB. Accordingly, when an IAB node is used to support a V2V service, the restriction on a delivery range of a V2V message may be significantly reduced. Furthermore, as a time-critical V2V message is sensitive to the increase of latency, the proposed technique enables local routing of V2V traffic, and the increase of latency will not be as great as that of the existing method.

Generally, V2V communication uses a sidelink for V2X. Accordingly, in the case of a terminal that does not support a sidelink, it has a limitation in receiving a V2V service. Since a broadcast message of an SIB type is used to deliver a V2V message, a terminal not supporting sidelink may use a message delivery service according to the proposed technique.

Systems and Various Devices to which Embodiments of the Present Disclosure are Applicable Various embodiments of the present disclosure may be combined with each other.

Hereinafter, a device will be described to which various embodiments of the present disclosure is applicable. Although not limited thereto, various descriptions, functions, procedures, proposals, methods and/or operation flowcharts disclosed in this document are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 25:
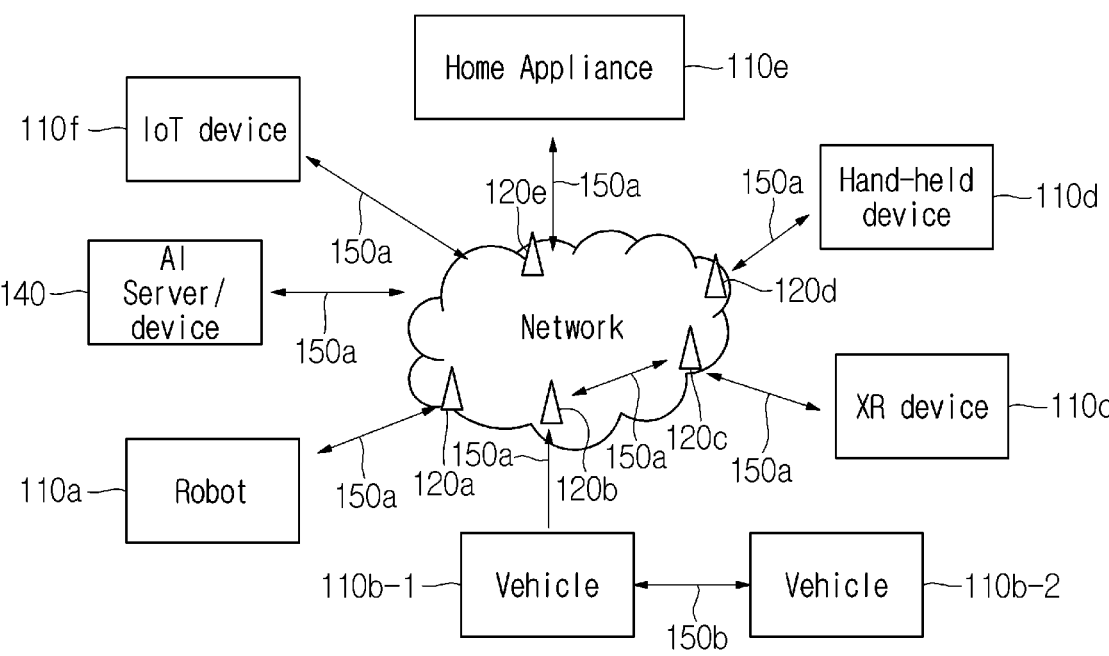
FIG. 25 illustrates a communication system, in accordance with an embodiment of the present disclosure.

FIG. 25 illustrates a communication system, in accordance with an embodiment of the present disclosure. The embodiment of FIG. 25 may be combined with various embodiments of the present disclosure.

Referring to FIG. 25, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120a to 120e network may be implemented by a wireless device, and a specific wireless device 120a may operate as a base station/network node for another wireless device.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network through the base station 120. AI technology is applicable to the wireless devices 100a to 100f, and the wireless devices 100a to 100f may be connected to the AI server 100g through the network. The network may be configured using a 3G network, a 4G (e.g., LTE) network or a 5G (e.g., NR) network, etc. The wireless devices 100a to 100f may communicate with each other through the base stations 120a to 120e or perform direct communication (e.g., sidelink communication) without through the base stations 120a to 120e. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base stations 120a to 120e and the base stations 120a to 120e/the base stations 120a to 120e. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 26:
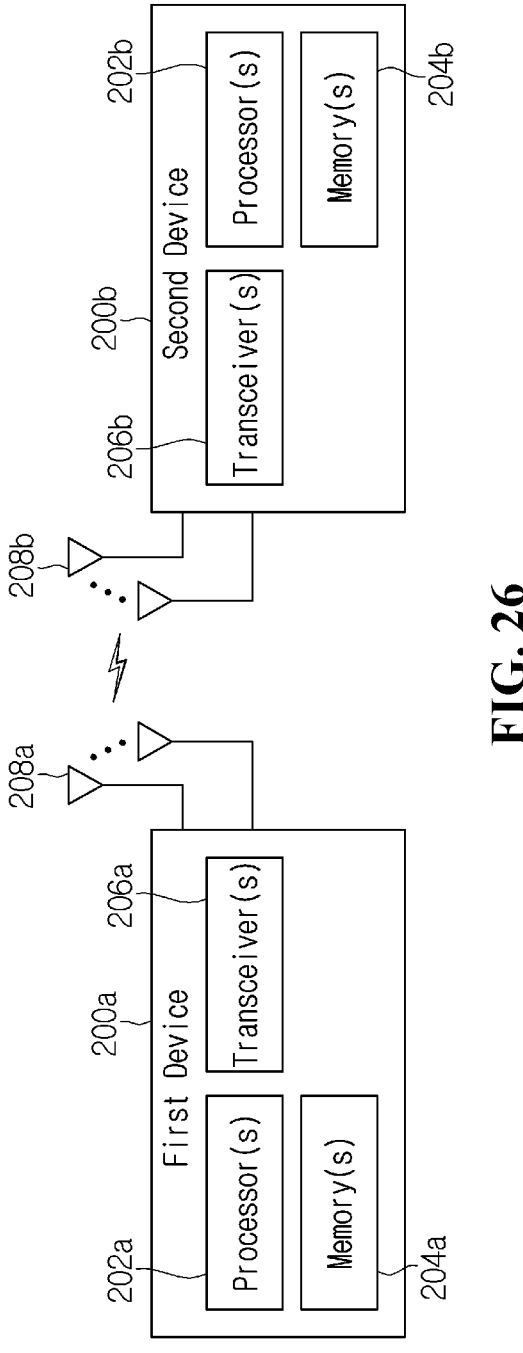
FIG. 26 illustrates wireless devices, in accordance with an embodiment of the present disclosure.

FIG. 26 illustrates wireless devices, in accordance with an embodiment of the present disclosure. The embodiment of FIG. 26 may be combined with various embodiments of the present disclosure.

Referring to FIG. 26, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 25.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may perform wireless communications with the first wireless device 200a and may include one or more processors 202b and one or more memories 204b and may further include one or more transceivers 206b and/or one or more antennas 208b. The functions of the one or more processors 202b, one or more memories 204b, one or more transceivers 206b, and/or one or more antennas 208b are similar to those of one or more processors 202a, one or more memories 204a, one or more transceivers 206a and/or one or more antennas 208a of the first wireless device 200a.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs), one or more service data unit (SDU), messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. In addition, one or more transceivers 206a and 206b may be coupled with one or more antennas 208a and 208b, and may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 27:
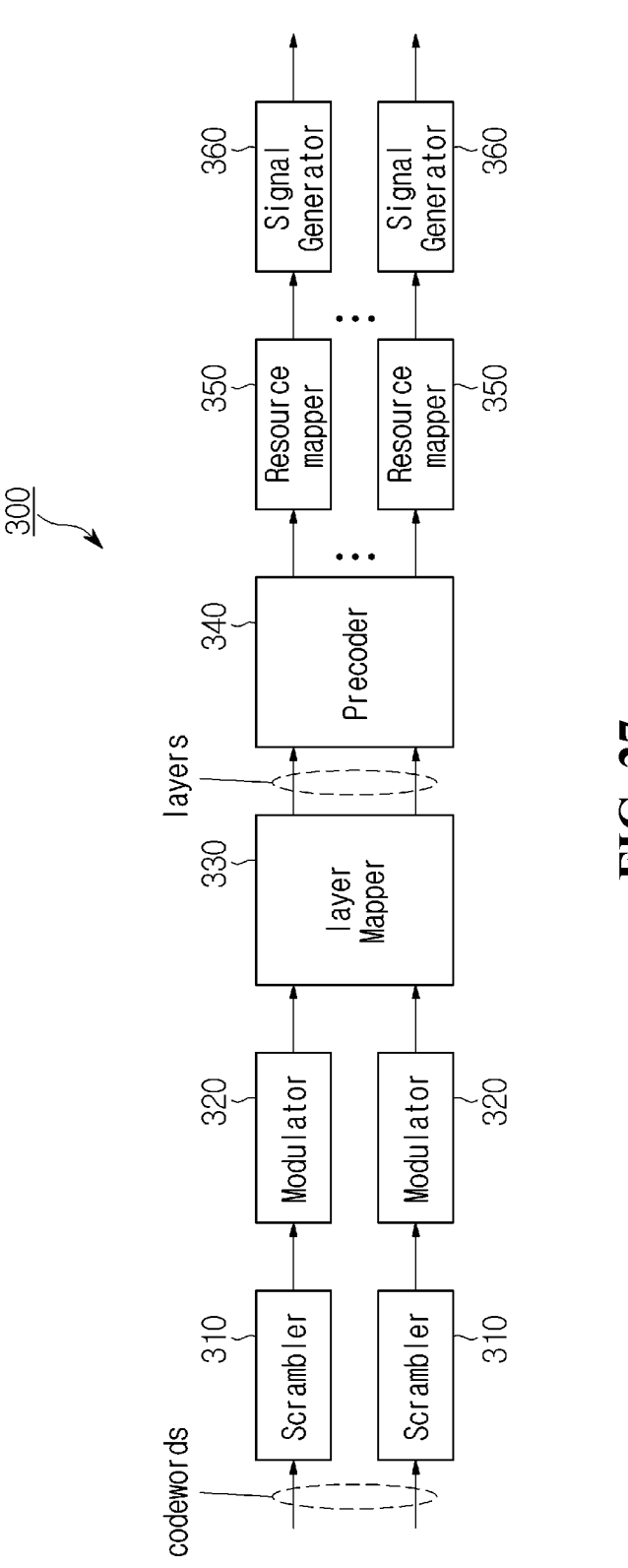
FIG. 27 illustrates a signal process circuit for a transmission signal, in accordance with an embodiment of the present disclosure.

FIG. 27 illustrates a signal process circuit for a transmission signal, in accordance with an embodiment of the present disclosure. The embodiment of FIG. 27 may be combined with various embodiments of the present disclosure.

Referring to FIG. 27, a signal processing circuit 300 may include scramblers 310, modulators 320, a layer mapper 330, a precoder 340, resource mappers 350, and signal generators 360. For example, an operation/function of FIG. 27 may be performed by the processors 202a and 202b and/or the transceivers 36 and 206 of FIG. 26. Hardware elements of FIG. 27 may be implemented by the processors 202a and 202b and/or the transceivers 36 and 206 of FIG. 26. For example, blocks 310 to 360 may be implemented by the processors 202a and 202b of FIG. 26. Alternatively, the blocks 310 to 350 may be implemented by the processors 202a and 202b of FIG. 26 and the block 360 may be implemented by the transceivers 36 and 206 of FIG. 26, and it is not limited to the above-described embodiment.

Codewords may be converted into radio signals via the signal processing circuit 300 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH). Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 27. For example, the wireless devices (e.g., 200a and 200b of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
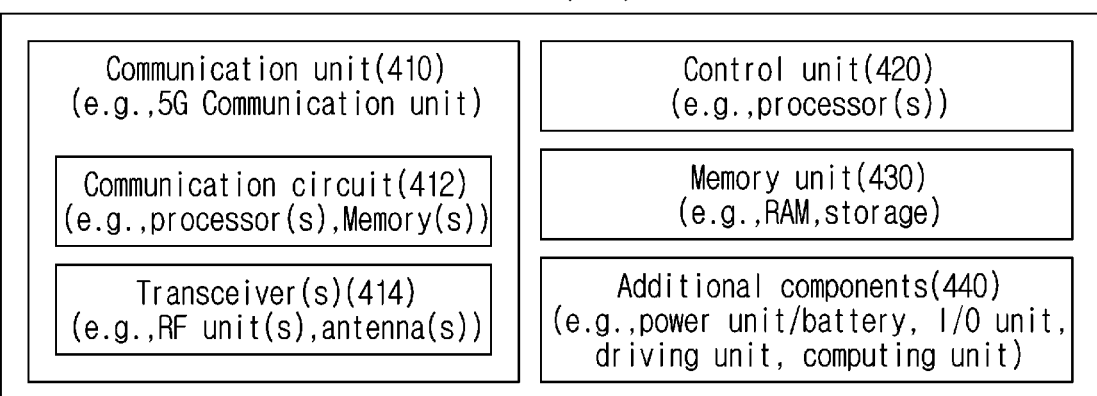
FIG. 28 illustrates a wireless device, in accordance with an embodiment of the present disclosure.

FIG. 28 illustrates a wireless device, in accordance with an embodiment of the present disclosure. The embodiment of FIG. 28 may be combined with various embodiments of the present disclosure.

Referring to FIG. 28, a wireless device 300 may correspond to the wireless devices 200a and 200b of FIG. 26 and include various elements, components, units/portions and/or modules. For example, the wireless device 300 may include a communication unit 310, a control unit (controller) 320, a memory unit (memory) 330 and additional components 340.

The communication unit 410 may include a communication circuit 412 and a transceiver(s) 414. The communication unit 410 may transmit and receive signals (e.g., data, control signals, etc.) to and from other wireless devices or base stations. For example, the communication circuit 412 may include one or more processors 202a and 202b and/or one or more memories 204a and 204b of FIG. 26. For example, the transceiver(s) 414 may include one or more transceivers 206a and 206b and/or one or more antennas 208a and 208b of FIG. 26.

The control unit 420 may be composed of at least one processor set. For example, the control unit 420 may be composed of a set of a communication control processor, an application processor, an electronic control unit (ECU), a graphic processing processor, a memory control processor, etc. The control unit 420 may be electrically coupled with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The memory unit 430 may be composed of a random access memory (RAM), a dynamic RAM (DRAM), a read only memory (ROM), a flash memory, a volatile memory, a non-volatile memory and/or a combination thereof. The memory unit 430 may store data/parameters/programs/codes/commands necessary to derive the wireless device 400. In addition, the memory unit 430 may store input/output data/information, etc.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 25, 110a), the vehicles (FIG. 25, 110b-1 and 110b-2), the XR device (FIG. 41, 110c), the hand-held device (FIG. 25, 110d), the home appliance (FIG. 25, 110e), the IoT device (FIG. 25, 110f), a digital broadcast terminal, a hologram apparatus, a public safety apparatus, an MTC apparatus, a medical apparatus, a Fintech device (financial device), a security device, a climate/environment device, an AI server/device (FIG. 25, 140), the base station (FIG. 25, 120), a network node, etc. The wireless device may be movable or may be used at a fixed place according to use example/service.

Figure 29:
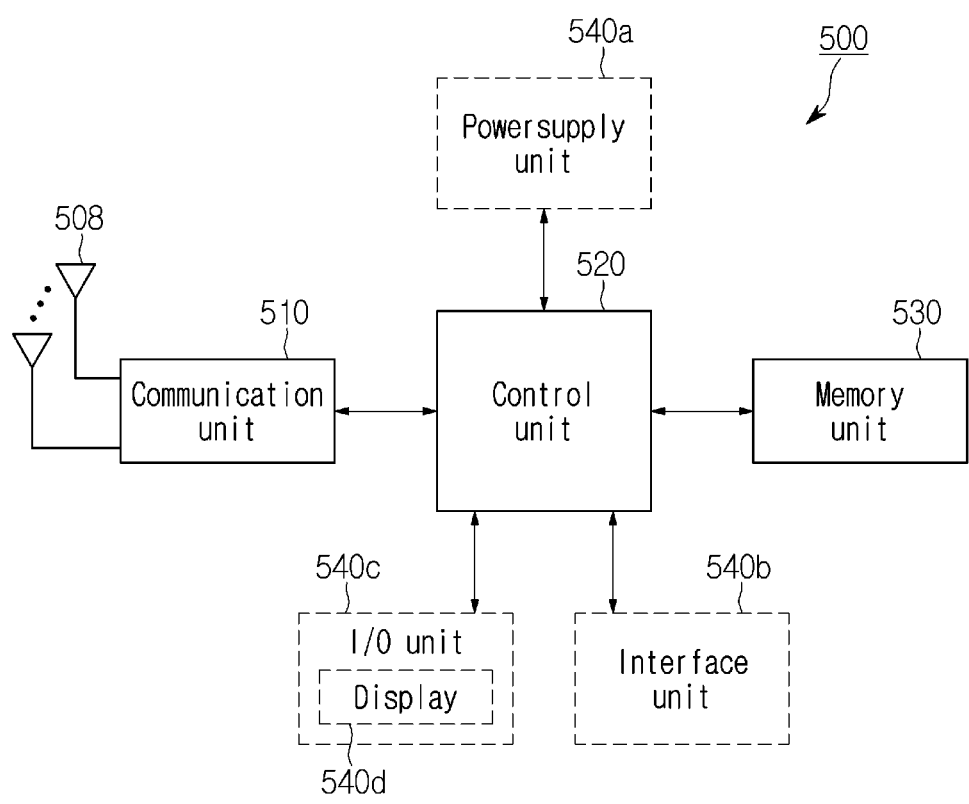
FIG. 29 illustrates a hand-held device, in accordance with an embodiment of the present disclosure.

FIG. 29 illustrates a hand-held device, in accordance with an embodiment of the present disclosure. FIG. 29 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 29 may be combined with various embodiments of the present disclosure.

Referring to FIG. 29, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/440a to 540c may correspond to the blocks 310 to 330/340 of FIG. 28, respectively, and duplicate descriptions are omitted.

The communication unit 510 may transmit and receive signals and the control unit 520 may control the hand-held device 500, and the memory unit 530 may store data and so on. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Figure 30:
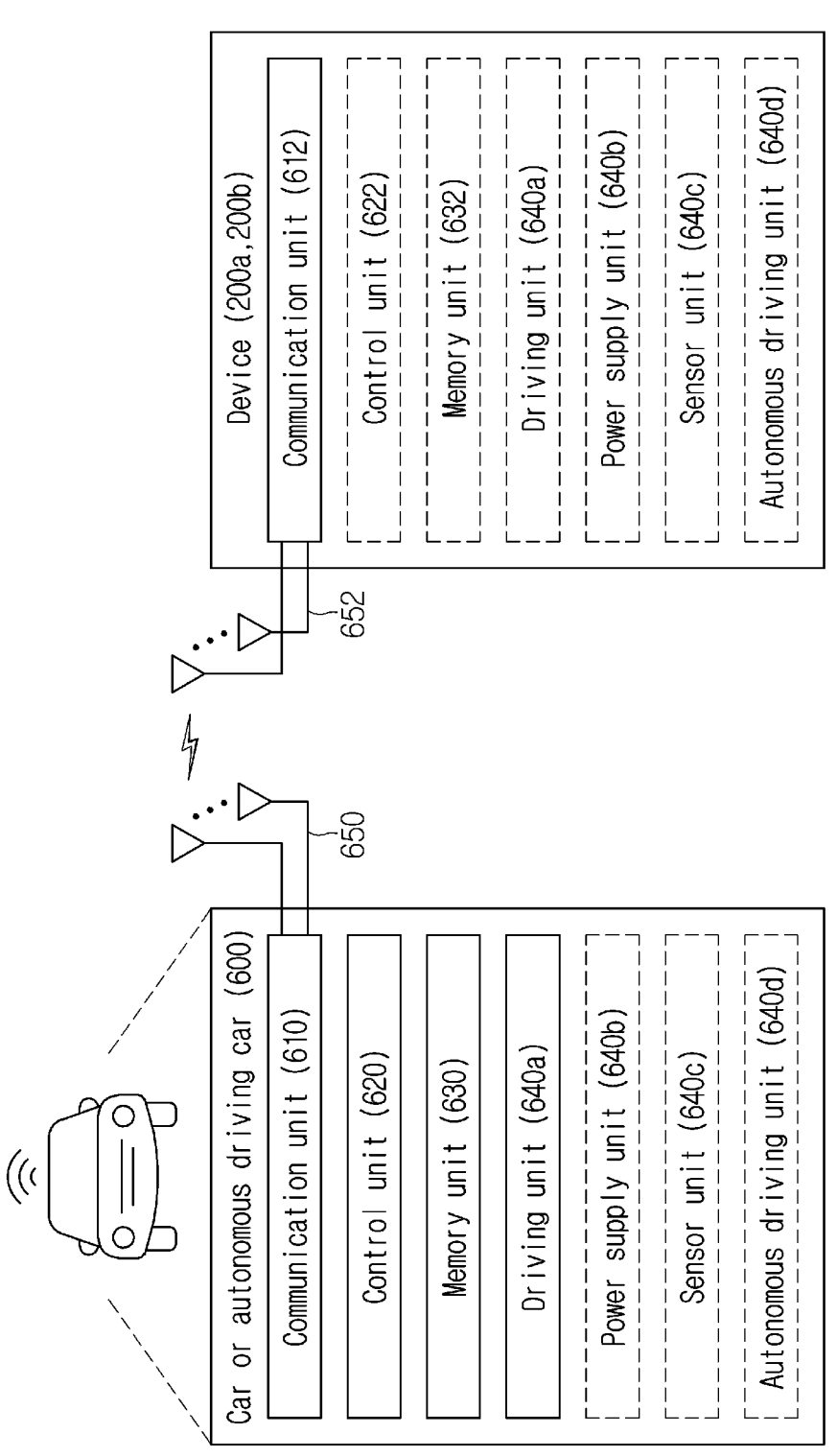
FIG. 30 illustrates a car or an autonomous vehicle, in accordance with an embodiment of the present disclosure.

FIG. 30 illustrates a car or an autonomous vehicle, in accordance with an embodiment of the present disclosure. FIG. 30 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 30 may be combined with various embodiments of the present disclosure Referring to FIG. 30, the car or autonomous driving car 600 may include an antenna unit (antenna) 608, a communication unit (transceiver) 610, a control unit (controller) 620, a driving unit 640a, a power supply unit (power supply) 640b, a sensor unit 640c, and an autonomous driving unit 640d. The antenna unit 650 may be configured as part of the communication unit 610. The blocks 610/630/640a to 640d correspond to the blocks 510/530/540 of FIG. 29, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640a may drive the car or autonomous driving car 600 on the ground. The driving unit 640a may include an engine, a motor, a power train, wheels, a brake, a steering device, etc. The power supply unit 640b may supply power to the car or autonomous driving car 600, and include a wired/wireless charging circuit, a battery, etc. The sensor unit 640c may obtain a vehicle state, surrounding environment information, user information, etc. The sensor unit 640c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640d may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640d may generate an autonomous driving route and a driving plan based on the acquired data. The control unit 620 may control the driving unit 640a (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640c may acquire a vehicle state and surrounding environment information. The autonomous driving unit 640d may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mm Wave and THzWave communication systems using ultrahigh frequency bands.

Additionally, the embodiments of the present disclosure are applicable to various applications such as autonomous vehicles, drones and the like.

The invention claimed is:

1. A method for operating an integrated access and backhaul (IAB) node in a wireless communication system, the method comprising:

establishing a directlink connection with a terminal;

receiving data including an event message from the terminal through the directlink connection;

generating control information indicating whether to deliver the event message to a parent node; and transmitting system information to at least one terminal, wherein the IAB node includes an IAB-mobile terminal (MT) and an IAB-distributed unit (DU), wherein the IAB-MT is a component for connecting with the parent node, wherein the IAB-DU is a component for connecting with at least one child node, including the terminal, wherein the data includes the event message that is transmitted to the at least one terminal through the system information, and wherein the control information includes a number of hops to which the event message is delivered.

2. The method of claim 1, further comprising:

transmitting the event message to a parent IAB node through a wireless backhaul link.

3. The method of claim 1, further comprising:

determining, based on the control information, whether or not to deliver the event message to a parent IAB node.

4. The method of claim 3, wherein an initial value of the control information is provided by an IAB donor during an initial connection with the IAB donor.

5. The method of claim 3, wherein the initial value of the control information is determined based on the event message.

6. The method of claim 1, wherein the directlink connection is established by signaling that uses a reserved resource for the directlink.

7. An integrated access and backhaul (IAB) node in a wireless communication system, the IAB node comprising:

a transceiver; and a processor coupled with the transceiver, and configured to:

establish a directlink connection with a terminal, receive data including an event message from the terminal through the directlink connection, generate control information indicating whether to deliver the event message to a parent node, and transmit system information to at least one terminal, wherein the IAB node includes an IAB-mobile terminal (MT) and an IAB-distributed unit (DU), wherein the IAB-MT is a component for connecting with the parent node, wherein the IAB-DU is a component for connecting with at least one child node, including the terminal, wherein the data includes the event message that is transmitted to the at least one terminal through the system information, and wherein the control information includes a number of hops to which the event message is delivered.

8. The IAB node of claim 7, wherein the processor is further configured to:

transmit the event message to a parent IAB node through a wireless backhaul link.

9. The IAB node of claim 7, wherein the processor is further configured to:

determine, based on the control information, whether or not to deliver the event message to a parent IAB node.

10. The IAB node of claim 9, wherein an initial value of the control information is provided by an IAB donor during an initial connection with the IAB donor.

11. The IAB node of claim 9, wherein the initial value of the control information is determined based on the event message.

12. The IAB node of claim 7, wherein the directlink connection is established by signaling that uses a reserved resource for the directlink.

13. A device comprising at least one memory and at least one processor functionally connected to the at least one memory, wherein the at least one processor controls the device to:

establish a directlink connection with a terminal, receive data including an event message from the terminal through the directlink connection, generating control information indicating whether to deliver the event message to a parent node; and transmit system information to at least one terminal, wherein the IAB node includes an IAB-mobile terminal (MT) and an IAB-distributed unit (DU), wherein the LAB-MT is a component for connecting with the parent node, wherein the IAB-DU is a component for connecting with at least one child node, including the terminal, wherein the data includes the event message that is transmitted to the at least one terminal through the system information, and wherein the IAB node selectively performs delivery of the event message to the parent node based on control information.

\* \* \* \* \*